US012775375B2

(12) United States Patent
Kyung et al.

(10) Patent No.: US 12,775,375 B2
(45) Date of Patent: Oct. 27, 2026

(54) ELECTRONIC DEVICE AND MOTOR DRIVING METHOD USING SAME

(71) Applicant: Samsung Electronics Co., Ltd., Suwon-si (KR)

(72) Inventors: Sunghyun Kyung, Suwon-si (KR); Sangheon Kim, Suwon-si (KR); Kwangtaek Woo, Suwon-si (KR); Minsoo Kim, Suwon-si (KR); Soogyu Lee, Suwon-si (KR); Jiwoo Lee, Suwon-si (KR); Yonggil Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/368,505

(22) Filed: Oct. 24, 2025

(65) Prior Publication Data

US 2026/0050372 A1 Feb. 19, 2026

Related U.S. Application Data

(63) Continuation of application No. PCT/KR2024/003011, filed on Mar. 8, 2024.

(30) Foreign Application Priority Data

May 2, 2023 (KR) ........................ 10-2023-0057223

(51) Int. Cl.
*G06F 3/041* (2006.01)
*G06F 1/16* (2006.01)
(Continued)

(52) U.S. Cl.
CPC .......... *G06F 3/0488* (2013.01); *G06F 1/1652* (2013.01); *G06F 3/04847* (2013.01);
(Continued)

(58) Field of Classification Search
CPC .... G06F 1/1624; G06F 1/1643; G06F 1/1652; G06F 1/1677; G06F 1/1684;
(Continued)

(56) References Cited

U.S. PATENT DOCUMENTS 11,009,912 B2 5/2021 Kim et al.
11,595,505 B2 2/2023 Noh et al.
(Continued)

FOREIGN PATENT DOCUMENTS

EA 2023/063681 A1 4/2023
EP 4 027 627 A1 7/2022
(Continued)

OTHER PUBLICATIONS

International Search Report with English translation dated Jun. 18, 2024; International Appln. No. PCT/KR2024/003011.
(Continued)

*Primary Examiner* — Insa Sadio
(74) *Attorney, Agent, or Firm* — Jefferson IP Law, LLP

(57) ABSTRACT

An electronic device is provided. The electronic device includes a first housing, a second housing slidably coupled to the first housing, a flexible display of which a display area varies based on a sliding motion of the second housing, a drive motor configured to control the sliding motion of the second housing, memory storing instructions, and at least one processor operatively coupled to the flexible display, the drive motor, and the memory. The instructions, when executed by the at least one processor individually or collectively, cause the electronic device to detect a touch input event for an object displayed through the flexible display, individually or collectively, cause the electronic device, identify whether the touch input event satisfies a sliding condition, when the touch input event satisfies the sliding condition, output sliding content corresponding to
(Continued)

the object, and drive the drive motor so that the display area of the flexible display varies on the basis of the sliding content.

20 Claims, 28 Drawing Sheets

(51) Int. Cl.
*G06F 3/04847* (2022.01)
*G06F 3/0488* (2022.01)

(52) U.S. Cl.
CPC .... *G06F 3/041* (2013.01); *G06F 2203/04102* (2013.01); *G06F 2203/04105* (2013.01)

(58) Field of Classification Search
CPC . G06F 2203/04102; G06F 2203/04105; G06F 3/016; G06F 3/041; G06F 3/0416; G06F 3/04817; G06F 3/0482; G06F 3/04847; G06F 3/0488; G06F 3/04883; H04M 1/02; H04M 1/0235; H04M 1/0237; H04M 1/0268; H04M 1/72448; H04M 2250/22
See application file for complete search history.

(56) References Cited

U.S. PATENT DOCUMENTS

| | | | | |
|---|---|---|---|---|
| 12,277,287 | B2 | 4/2025 | Kim et al. | |
| 2016/0112667 | A1* | 4/2016 | Park | G06F 3/0346 348/739 |
| 2018/0188938 | A1 | 7/2018 | Deselaers et al. | |
| 2018/0217679 | A1 | 8/2018 | Kwon et al. | |
| 2020/0012382 | A1 | 1/2020 | Lee | |
| 2021/0072796 | A1 | 3/2021 | Kim et al. | |
| 2021/0389873 | A1* | 12/2021 | Chen | G06F 1/1618 |
| 2022/0057919 | A1 | 2/2022 | Noh et al. | |
| 2022/0155889 | A1 | 5/2022 | Choi et al. | |
| 2022/0385750 | A1 | 12/2022 | Kim et al. | |
| 2023/0110166 | A1 | 4/2023 | Chung et al. | |
| 2023/0176720 | A1 | 6/2023 | Cheon et al. | |
| 2023/0245608 | A1 | 8/2023 | Park et al. | |
| 2023/0289047 | A1 | 9/2023 | Choi et al. | |

FOREIGN PATENT DOCUMENTS

| | | | |
|---|---|---|---|
| EP | 4 187 349 | A1 | 5/2023 |
| EP | 4 216 046 | A1 | 7/2023 |
| KR | 10-2019-0104101 | A | 9/2019 |
| KR | 10-2022-0045970 | A | 4/2022 |
| KR | 10-2022-0064024 | A | 5/2022 |
| KR | 10-2394985 | B1 | 5/2022 |
| KR | 10-2022-0077062 | A | 6/2022 |
| KR | 10-2022-0077746 | A | 6/2022 |
| KR | 10-2022-0078423 | A | 6/2022 |
| KR | 10-2022-0079370 | A | 6/2022 |
| KR | 10-2795391 | B1 | 4/2025 |
| WO | 2021/095925 | A1 | 5/2021 |
| WO | 2022/025450 | A1 | 2/2022 |
| WO | 2022/103174 | A1 | 5/2022 |
| WO | 2023/063681 | A1 | 4/2023 |

OTHER PUBLICATIONS

European Search Report dated Apr. 30, 2026, issued in European Application No. 24800148.9.

* cited by examiner

ELECTRONIC DEVICE AND MOTOR DRIVING METHOD USING SAME

CROSS-REFERENCE TO RELATED APPLICATION(S)

This application is a continuation application, claiming priority under 35 U.S.C. § 365(c), of an International application No. PCT/KR2024/003011, filed on Mar. 8, 2024, which is based on and claims the benefit of a Korean patent application number 10-2023-0057223, filed on May 2, 2023, in the Korean Intellectual Property Office, the disclosure of which is incorporated by reference herein in its entirety.

BACKGROUND

1. Field

The disclosure relates to an electronic device and a motor driving method using the same.

2. Description of Related Art

Electronic devices are gradually becoming slimmer, more rigid, and more design-oriented, and, at the same time, are being developed to be more differentiated in terms of their functional elements. Electronic devices are gradually changing into various shapes beyond a uniform rectangular shape. For example, an electronic device may have a deformable structure that is easy to carry and is capable of using a large-screen display. The electronic device may have a structure (e.g., rollable structure or slidable structure) that may change a display area of a flexible display (e.g., rollable display) through supporting of housings that operate in a sliding manner with respect to each other. This electronic device may require an efficient layout structure of a driving module (e.g., driving motor) that may automatically slide a remaining housing based on a single housing.

The above information is presented as background information only to assist with an understanding of the disclosure. No determination has been made, and no assertion is made, as to whether any of the above might be applicable as prior art with regard to the disclosure.

SUMMARY

An electronic device may include a rollable electronic device (e.g., slidable electronic device) in which a display area of a flexible display (e.g., rollable display) may be extended and/or reduced depending on an operating status. The rollable electronic device may include a first housing and a second housing that are movably coupled to each other in a manner that is at least partially fitted together. For example, the first housing and the second housing may slidably operate with respect to each other, and by supporting at least a portion of the flexible display (e.g., rollable display, expandable display, or stretchable display), the flexible display may be induced to have a first display area in a slide-in state, and may be induced to have a second display area larger than the first display area in a slide-out state.

In response to a sliding command, the electronic device may perform the sliding motion of changing from the slide-in state to the slide-out state, or changing from the slide-out state to the slide-in state. For example, the sliding command may be executed based on a physical button input or a softwarely-implemented object input. The electronic device may perform the sliding motion in response to input to a button or an object, unintended by a user. The sliding motion of the electronic device may malfunction regardless of the user's intent.

According to an embodiment, the electronic device may detect not a general touch input, but a force touch input (e.g., a force touch input for an object displayed through a display) in which a contact area of a finger increases at a certain ratio, through the display, and in response to detecting the force touch input, may perform the sliding motion. According to an embodiment, the electronic device that performs the sliding motion according to the user intent may be provided.

Aspects of the disclosure are to address at least the above-mentioned problems and/or disadvantages and to provide at least the advantages described below. Accordingly, an aspect of the disclosure is to provide an electronic device and a motor driving method using the same.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing configured to slidably couple to the first housing, a flexible display of which a display area varies based on a sliding motion of the second housing, a driving motor configured to control the sliding motion of the second housing, memory storing instructions, and at least one processor operatively coupled to the flexible display, the driving motor, and the memory. The instructions, when executed by the at least one processor individually or collectively, cause the electronic device to detect a touch input event for an object displayed through the flexible display, in response to detecting the touch input event, t identify whether the touch input event satisfies a sliding condition, when the touch input event satisfies the sliding condition, output sliding content corresponding to the object, and drive the driving motor such that the display area of the flexible display varies based on the sliding content.

In accordance with another aspect of the disclosure, a method performed by an electronic device including a first housing, a second housing configured to slidably couple to the first housing, a flexible display of which a display area varies based on a sliding motion of the second housing, and a driving motor configured to control the sliding motion of the second housing is provided. The method includes detecting a touch input event for an object displayed through the flexible display, in response to detecting the touch input event, identifying whether the touch input event satisfies a sliding condition, when the touch input event satisfies the sliding condition, outputting sliding content corresponding to the object, and driving the driving motor such that the display area of the flexible display varies based on the sliding content.

In accordance with another aspect of the disclosure, one or more non-transitory computer-readable storage media (or computer program product) storing instructions is provided. According to an embodiment, the instructions, when executed by at least one processor of an electronic device individually or collectively, which includes a first housing, a second housing configured to slidably couple to the first housing, a flexible display of which a display area varies based on a sliding motion of the second housing, and a driving motor configured to control the sliding motion of the second housing, causes the electronic device to perform operations. The operations include detecting a touch input event for an object displayed through the flexible display, in response to detecting the touch input event, identifying whether the touch input event satisfies a sliding condition, when the touch input event satisfies the sliding condition, outputting sliding content corresponding to the object, and driving the driving motor such that the display area of the flexible display varies based on the sliding content.

According to an embodiment, an electronic device (e.g., slidable electronic device, rollable electronic device) may detect a touch input of a user and may distinguish a type of the touch input through a display (e.g., flexible display). For example, the touch input may include a short touch input that is input for less than a set period of time, a long touch input that is input for greater than the set period of time, and/or a force touch input that is input while a contact area increases at a certain ratio. If the force touch input (e.g., sliding condition, condition for performing sliding motion) is detected through the display, the electronic device may perform the sliding motion by driving the driving motor.

According to an embodiment, in response to a first touch input (e.g., force touch input) satisfying the sliding condition, the electronic device may acquire feature information of an object corresponding to the first touch input and may output sliding content (e.g., visual indicator) based on the acquired feature information of the object. The electronic device may drive the driving motor such that the display area of the display varies based on the output sliding content. According to an embodiment, the electronic device may drive the driving motor such that the sliding motion is performed for a sliding length desired by the user. According to an embodiment, when the electronic device controls the sliding motion, the user convenience may be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
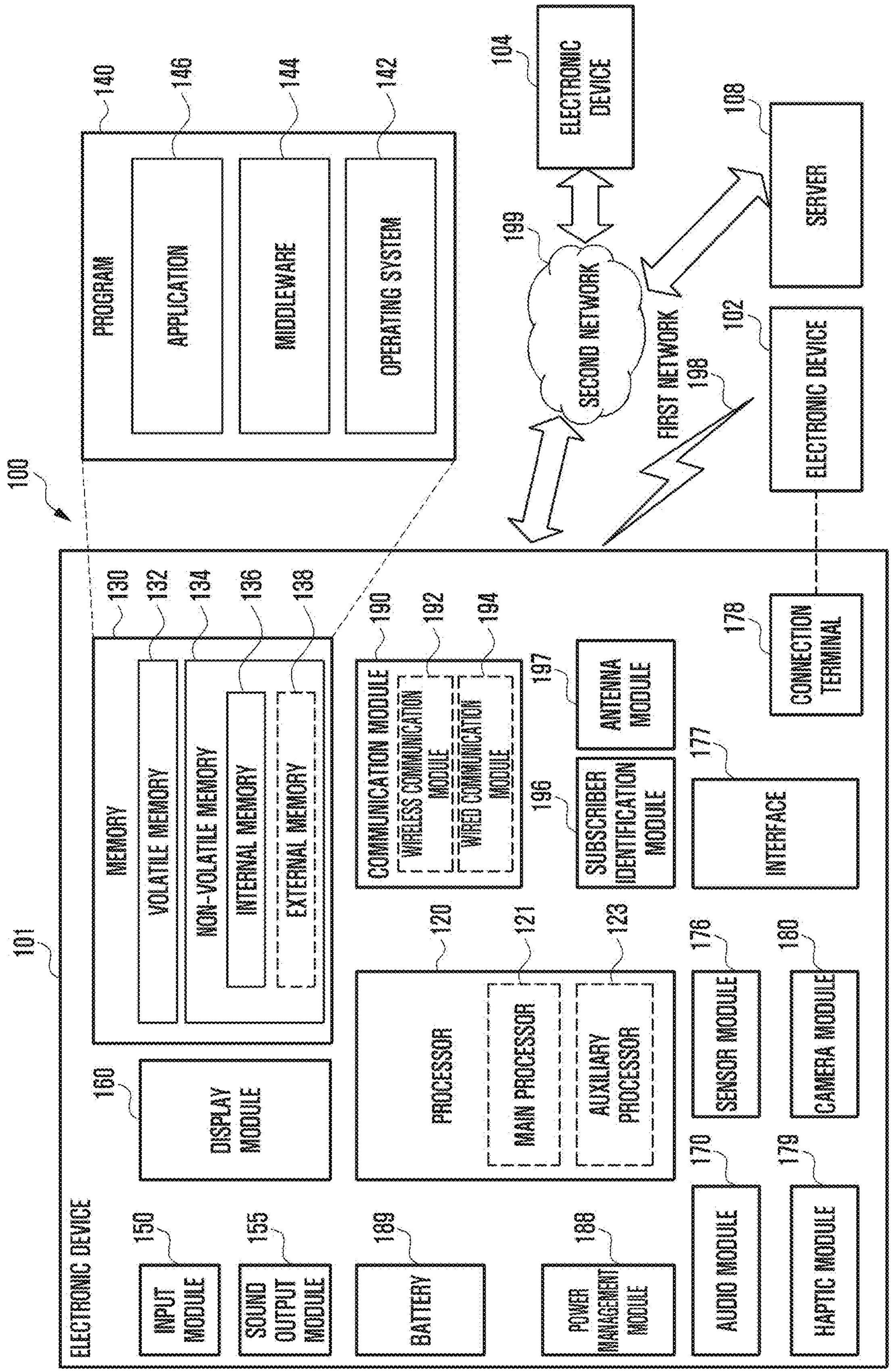
FIG. 1 is a block diagram of an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., a speaker or a headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). For example, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
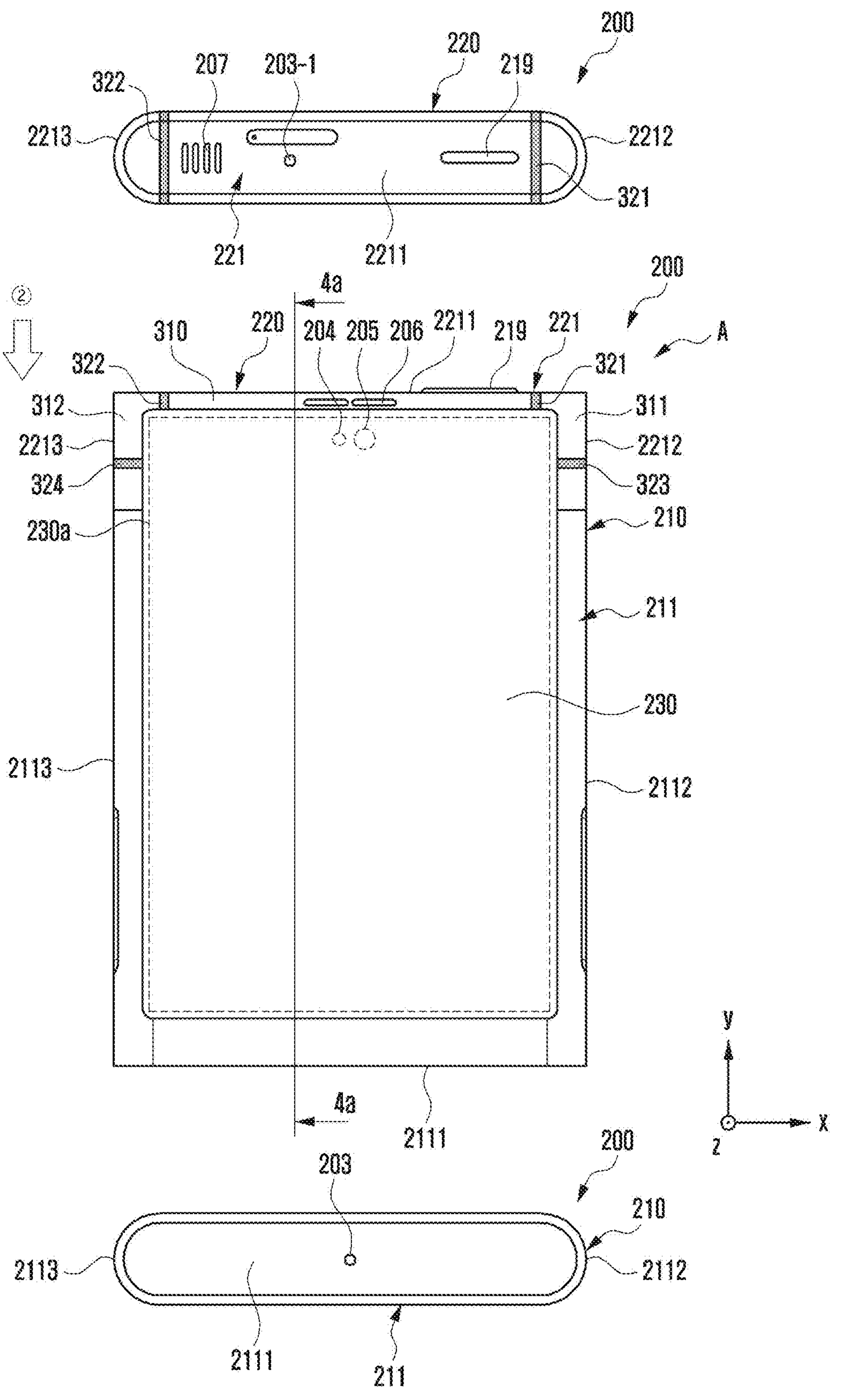
FIG. 2A is a view illustrating the front surface of an electronic device in a slide-in state according to an embodiment of the disclosure.

FIG. 2A is diagram illustrating front view of an electronic device in a slide-in state according to an embodiment of the disclosure.

Figure 2B:
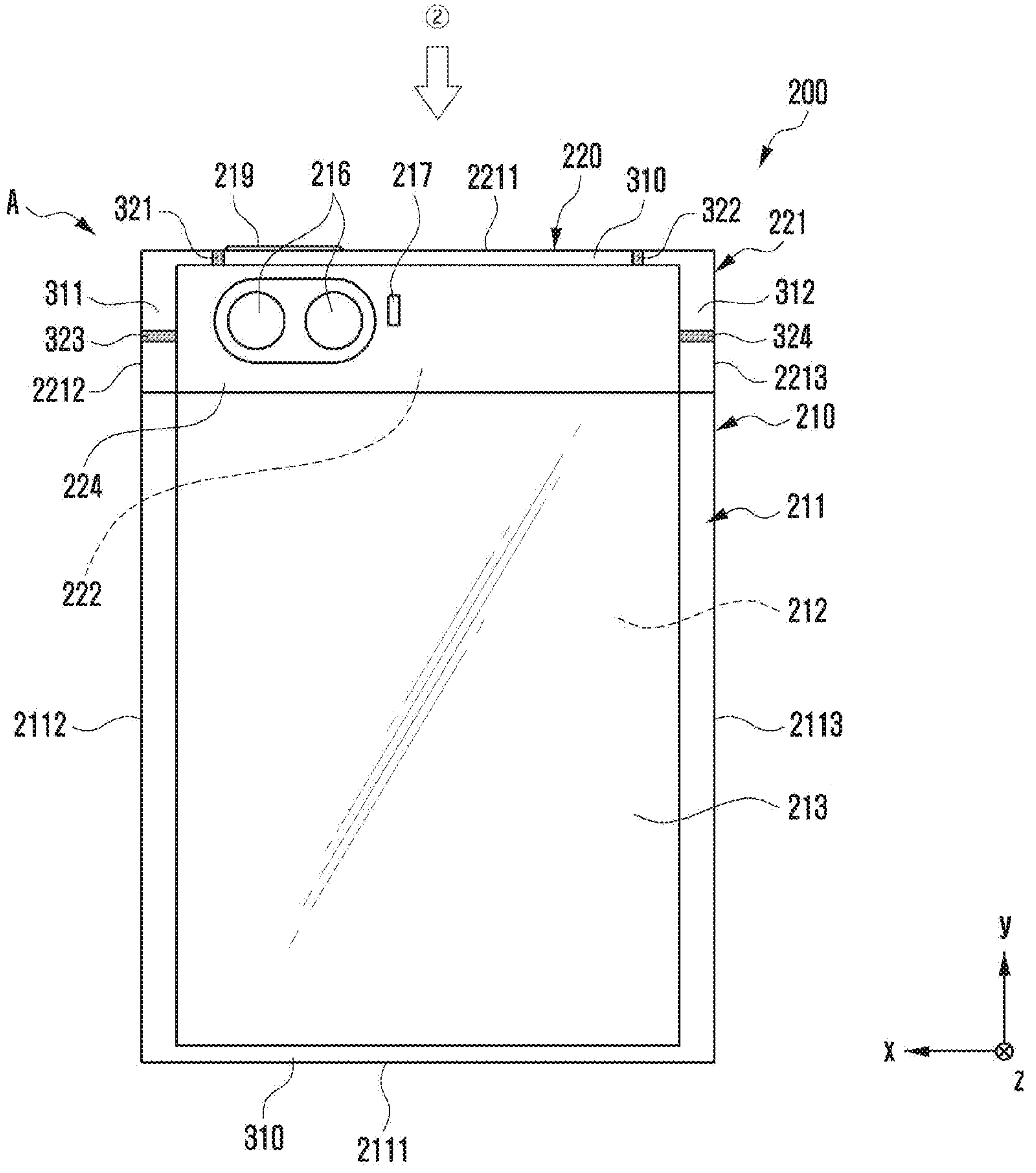
FIG. 2B is a view illustrating the rear surface of an electronic device in a slide-in state according to an embodiment of the disclosure.

FIG. 2B is diagram illustrating rear view of an electronic device in a slide-in state according to an embodiment of the disclosure.

Figure 3A:
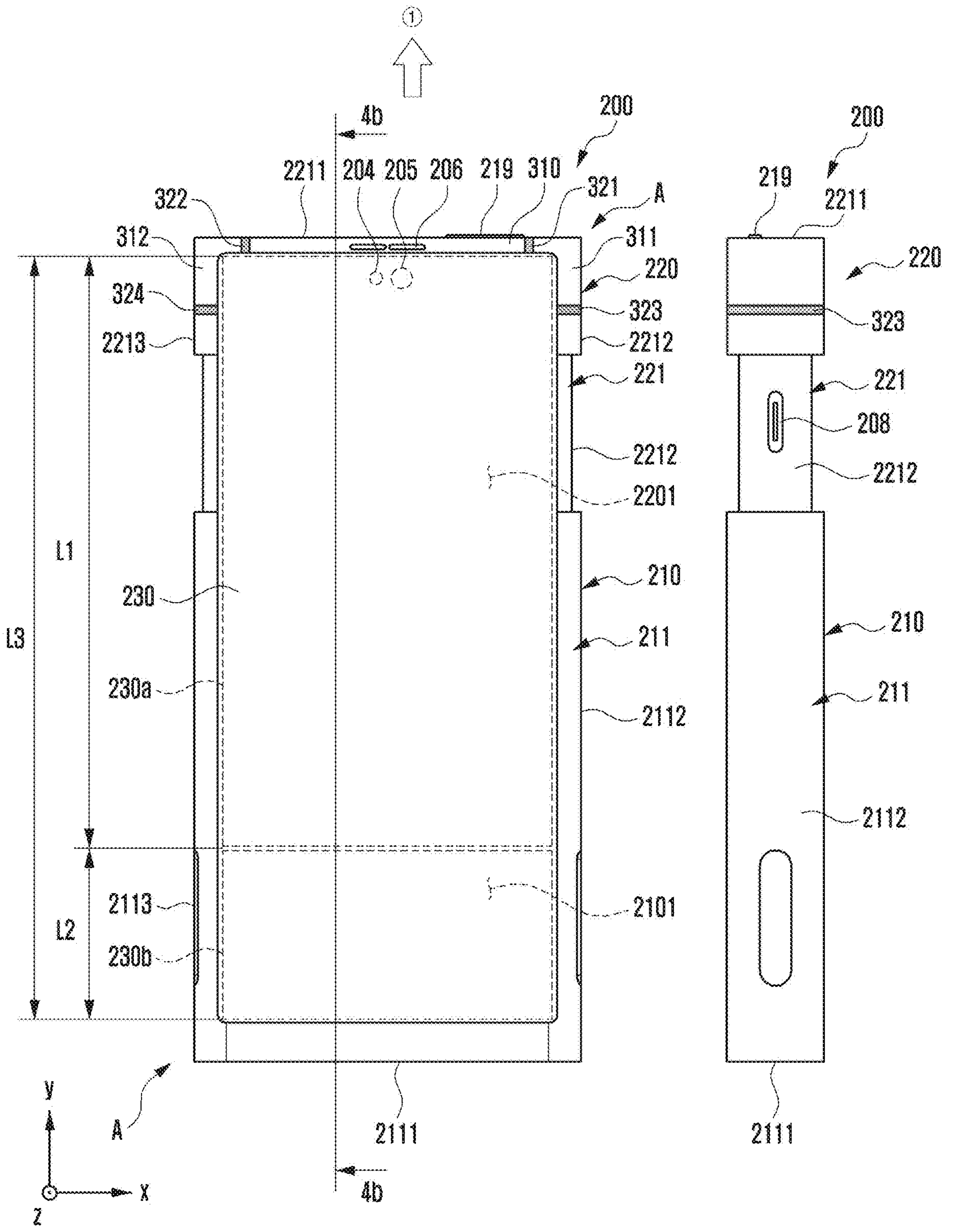
FIG. 3A is a view illustrating the front surface of an electronic device in a slide-out state according to an embodiment of the disclosure.

FIG. 3A is diagram illustrating front view of an electronic device in a slide-out state according to an embodiment of the disclosure.

Figure 3B:
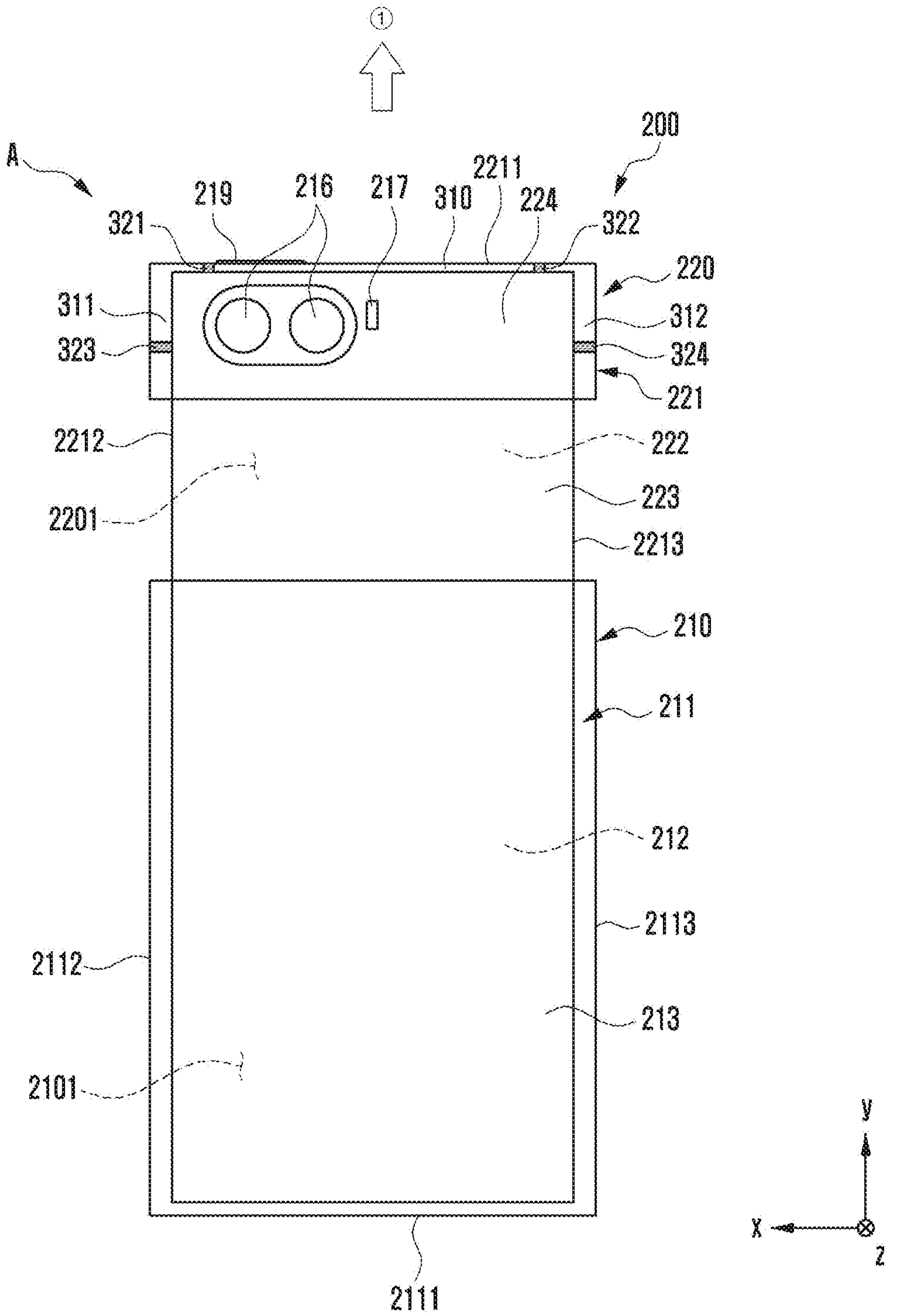
FIG. 3B is a view illustrating the rear surface of an electronic device in a slide-out state according to an embodiment of the disclosure.

FIG. 3B is diagram illustrating rear view of an electronic device in a slide-out state according to an embodiment of the disclosure.

The electronic device 200 of FIGS. 2A to 3B may be at least partially similar to the electronic device 101 of FIG. 1 or may further include other embodiments of the electronic device.

Referring to FIGS. 2A, 2B, 3A, and 3B, the electronic device 200 may include a first housing 210, a second housing 220 that is slidably coupled to the first housing 210 in a specified direction (e.g., the direction ① or the direction ② (e.g., the +y-axis direction), and a flexible display 230 (e.g., the rollable display, the expandable display, the display module 160 of FIG. 1 or the stretchable display) that is disposed to be supported by at least a portion of the first housing 210 and the second housing 220. In one embodiment, the second housing 220 may be slidably coupled to the first housing 210 so as to be slid out in a first direction (e.g., the direction ①) or slid in a second direction (e.g., the direction ②) that is opposite to the first direction (e.g., the direction ①). In one embodiment, the electronic device 200 may be changed into a slide-in state (e.g., the retracted state) by accommodating at least a portion of the second housing 220 in at least a portion of the first space 2101 formed by the first housing 210. In one embodiment, the electronic device 200 may be changed into a slide-out state (e.g., the extended state) by moving at least a portion of the second housing 220 outwardly (e.g., the direction of ① from the first space 2101. In one embodiment, the electronic device 200 may include a support member (e.g., the support member 240 of FIG. 4A) (e.g., the bendable member, the articulating hinge module, the multi-bar assembly, or the multi-bar) that, in a slide-out state, forms at least partially the same plane as at least a portion of the second housing 220, and, in a slide-in state, is accommodated at least partially into the first space 2101 of the first housing 210 in a bendable manner. In one embodiment, at least a portion of the flexible display 230 may be disposed to be supported by at least a portion of the second housing 220. In one embodiment, at least a portion of the remaining portion of the flexible display 230 may be disposed to be supported by the support member 240 (e.g., the support member 240 of FIG. 4A). In one embodiment, the support member 240 may be disposed in a manner that it is attached to the rear surface of the flexible display 230. In one embodiment, at least a portion of the flexible display 230 may be accommodated in a bendable manner into the first space 2101 of the first housing 210 while being supported by the support member (e.g., the support member 240 of FIG. 4A) in a slide-in state so that it is not visible from the outside. In one embodiment, at least a portion of the flexible display 230 may be moved so that it is visible from the outside while being supported by the support member (e.g., the support member 240 of FIG. 4A) that forms at least partially the same plane as the second housing 220 in a slide-out state.

According to various embodiments, the electronic device 200 may include a first housing 210 including a first lateral member 211 and a second housing 220 including a second lateral member 221. In one embodiment, the first lateral member 211 may be disposed on a lower side of the electronic device 200 and may include a first side surface 2111 having a first length, a second side surface 2112 extending in a vertical direction (e.g., the y-axis direction) from one end of the first side surface 2111 and having a second length, and a third side surface 2113 extending parallel to the second side surface 2112 from the other end of the first side surface 2111 and having a second length. In one embodiment, the first lateral member 211 may be at least partially formed of a conductive material (e.g., metal). In some embodiments, the first lateral member 211 may be formed by combining a conductive member and a non-conductive member (e.g., polymer). In one embodiment, the first housing 210 may include a first extension member 212 that extends from at least a portion of the first lateral member 211 to at least a portion of the first space 2101. In one embodiment, the first extension member 212 may be formed integrally with the first lateral member 211. In some embodiments, the first extension member 212 may be formed separately from the first lateral member 211 and structurally coupled to the first lateral member 211.

According to various embodiments, the second lateral member 221 may be disposed on an upper side of the electronic device 200 and may include a fourth side surface 2211 having a third length, a fifth side surface 2212 extending in a direction perpendicular to the second side surface 2112 from one end of the fourth side surface 2211 (e.g., the −y-axis direction) and having a fourth length, and a sixth side surface 2213 extending in a direction parallel to the fifth side surface 2212 from the other end of the fourth side surface 2211 and having a fourth length and corresponding to the third side surface 2113. In one embodiment, the second lateral member 221 may be formed at least partially of a conductive member (e.g., metal). In some embodiments, the second lateral member 221 may be formed by combining a conductive member and a non-conductive member (e.g., polymer). In one embodiment, at least a portion of the second lateral member 221 may include a second extension member 222 that extends to at least a portion of the second space 2201 of the second housing 220. In one embodiment, the second extension member 222 may be formed integrally with the second lateral member 221. In some embodiments, the second extension member 222 may be formed separately from the second lateral member 221 and structurally coupled to the second lateral member 221.

According to various embodiments, the second side surface 2112 and the fifth side surface 2212 may be slidably coupled with respect to each other. In one embodiment, the third side surface 2113 and the sixth side surface 2213 may be slidably coupled with respect to each other. In one embodiment, in the slide-in state, a portion of the fifth side surface 2212 may be disposed to overlap with the second side surface 2112 so as to be substantially invisible from the outside. In one embodiment, in the slide-in state, a remaining portion of the fifth side surface 2212 may be disposed to be visible from the outside. In some embodiments, in the slide-in state, the fifth side surface 2212 may be disposed to overlap with the second side surface 2112 so as to be substantially invisible from the outside. In one embodiment, in the slide-in state, a portion of the sixth side surface 2213 may be disposed to overlap with the third side surface 2113 so as to be substantially invisible from the outside. In one embodiment, in the slide-in state, the remaining portion of the sixth side surface 2213 may be disposed to be visible from the outside. In some embodiments, in the slide-in state, the sixth side surface 2213 may be disposed to overlap with the third side surface 2113 so as to be substantially invisible from the outside. In one embodiment, a portion of the second extension member 222 may be disposed to be visible from the outside in the slide-in state. In some embodiments, in the slide-in state, the second extension member 222 may be disposed to overlap with the first extension member 212 so as to be substantially invisible from the outside.

According to various embodiments, the first housing 210 may include a first rear cover 213 coupled to at least a portion of the first lateral member 211. In one embodiment, the first rear cover 213 may be disposed in such a way that it is coupled to at least a portion of the first extension member 212. In some embodiments, the first rear cover 213 may be formed integrally with the first lateral member 211. In one embodiment, the first rear cover 213 may be formed of a polymer, a coated or colored glass, a ceramic, a metal (e.g., aluminum, stainless steel (STS), or magnesium), or a combination of at least two of these materials. In some embodiments, the first rear cover 213 may extend to at least a portion of the first lateral member 211. In some embodiments, the first rear cover 213 may be omitted and at least a portion of the first extension member 212 may be replaced with the first rear cover 213.

According to various embodiments, the second housing 220 may include a second rear cover 223 coupled to at least a portion of the second lateral member 221. In one embodiment, the second rear cover 223 may be disposed so as to be coupled to at least a portion of the second extension member 222. In one embodiment, the second rear cover 223 may be formed integrally with the second lateral member 221. In one embodiment, the second rear cover 223 may be formed of a polymer, a coated or colored glass, a ceramic, a metal (e.g., aluminum, stainless steel (STS), or magnesium), or a combination of at least two of these materials. In some embodiments, the second rear cover 223 may extend to at least a portion of the second lateral member 221. In some embodiments, the second rear cover 223 may be omitted, and at least a portion of the second extension member 222 may be replaced with the second rear cover 223. In some embodiments, the second extension member 222 may be omitted, and the second rear cover 223 may be replaced with the second extension member 222. In one embodiment, the second housing 220 may include a window cover 224 disposed on at least a portion of the second rear cover. In one embodiment, the window cover 224 may be disposed in an area exposed to the outside of the second housing 220 in a slide-in state, and may be formed of a material that facilitates detection of an external environment through at least one camera module 216 and/or sensor module 217 disposed in an inner space 2201 of the second housing 220. For example, the window cover 224 may be formed of glass and/or polymer material in which at least an area corresponding to the camera module 216 and/or sensor module 217 is formed transparently.

According to various embodiments, the flexible display 230 may include a first portion 230*a* (e.g., the flat portion) that is always visible from the outside, and a second portion 230*b* (e.g., the bendable portion or a bending portion) that extends from the first portion 230*a* and is accommodated in a manner that is at least partially bent into the first space 2101 of the first housing 210 so as not to be visible from the outside in a slide-in state. In one embodiment, at least a portion of the first portion 230*a* may be disposed to be supported by the second housing 220, and at least a portion of the first portion 230*a* and the second portion 230*b* may be disposed to be at least partially supported by a support member (e.g., the support member 240 of FIG. 4A). In one embodiment, the second portion 230*b* of the flexible display 230 may be disposed to form substantially the same plane as the first portion 230*a* while being supported by a support member (e.g., the support member 240 of FIG. 4A) when the second housing 220 is slid out along the first direction (direction ①) and may be visible from the outside. In one embodiment, the second portion 230*b* of the flexible display 230 may be accommodated in a manner of bending into the first space 2101 of the first housing 210 when the second housing 220 is slid in along the second direction (direction ②) and may be disposed so as not to be visible from the outside. Accordingly, the flexible display 230 may have a variable display area as the second housing 220 slides along a specified direction (e.g., +y-axis direction) from the first housing 210.

According to various embodiments, the flexible display 230 may have a variable length in a sliding direction (e.g., direction ① or direction ② according to the sliding movement of the second housing 220 relative to the first housing 210. For example, the flexible display 230 may have a first display area (e.g., the area corresponding to the first portion 230*a*) corresponding to a first length L1 in a slide-in state. In one embodiment, the flexible display 230 may be extended to have a second display area (e.g., the area including the first portion 230*a* and the second portion 230*b*) corresponding to a third length L3 longer than the first length L1 and larger than the first display area, according to the movement distance of the second housing 220 moved by the second length L2 relative to the first housing 210 in a slide-out state.

According to various embodiments, the electronic device 200 may include at least one of an input device (e.g., the microphone 203-1), an audio output device (e.g., the call receiver 206 and/or a speaker 207), a sensor module 204 and 217, a camera module (e.g., the first camera module 205 or the second camera module 216), a connector port 208, a key input device 219, or an indicator (not shown) disposed in the second space 2201 of the second housing 220. In one embodiment, the electronic device 200 may include another input device (e.g., the microphone 203) disposed in the first housing 210. In some embodiments, the electronic device 200 may be configured such that at least one of the above-described components is omitted, or other components are additionally included. In some embodiments, at least one of the components described above may be disposed in the first space 2101 of the first housing 210.

According to various embodiments, the input device may include a microphone 203-1. In some embodiments, the input device (e.g., the microphone 203-1) may include a plurality of microphones disposed to detect the direction of sound. The audio output device may include, for example, a call receiver 206 and a speaker 207. In one embodiment, the speaker 207 may be in contact with the outside through at least one speaker hole formed in the second housing 220 at a position that is always exposed to the outside (e.g., the fourth side surface 2211), regardless of the slide-in/slide-out state. In one embodiment, the connector port 208 may be in contact with the outside through a connector port hole formed in the second housing 220 in the slide-out state. In one embodiment, the connector port 208 may be covered so as not to be visible from the outside in the slide-in state. In some embodiments, the connector port 208 may be formed in the first housing 210 in a slide-in state and may be externally responsive through an opening formed to correspond with the connector port hole. In some embodiments, the call receiver 206 may include a speaker (e.g., the piezo speaker) that is operated without a separate speaker hole.

According to various embodiments, the sensor modules 204 and 217 may generate electrical signals or data values corresponding to an internal operating state of the electronic device 200 or an external environmental state. In one embodiment, the sensor modules 204 and 217 may include, for example, a first sensor module 204 (e.g., the proximity sensor or the ambient light sensor) disposed on the front surface of the electronic device 200 and/or a second sensor module 217 (e.g., the heart rate monitoring (HRM) sensor) disposed on the rear surface of the electronic device 200. In one embodiment, the first sensor module 204 may be disposed on the front surface of the electronic device 200 under the flexible display 230. In one embodiment, the first sensor module 204 and/or the second sensor module 217 may include at least one of a proximity sensor, an ambient light sensor, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 205 disposed on the front surface of the electronic device 200 and a second camera module 216 disposed on the rear surface of the electronic device 200. In one embodiment, the electronic device 200 may also include a flash (not shown) disposed near the second camera module 216. In one embodiment, the camera modules 205 and 216 may include one or more lenses, an image sensor, and/or an image signal processor. In one embodiment, the first camera module 205 may be disposed under the flexible display 230 and configured to capture a subject through a portion of an active area (e.g., the display area) of the flexible display 230.

According to various embodiments, among the camera modules, the first camera module 205 and, among the sensor modules 204 and 217, the first sensor module 204 may be disposed to detect an external environment through the flexible display 230. For example, the first camera module 205 or the first sensor module 204 may be disposed in the second space 2201 of the second housing 220 so as to be in contact with the external environment through a transparent area or a perforated opening formed in the flexible display 230. In one embodiment, an area of the flexible display 230 facing the first camera module 205 may be formed as a transparent area having a designated transmittance as part of an active area that displays content. In one embodiment, the transparent area may be formed to have a transmittance in a range of about 5% to about 20%. Such a transparent area may include an area overlapping with an effective area (e.g., the field of view area) of the first camera module 205 through which light passes to be imaged by the image sensor to generate an image. For example, the transparent area of the flexible display 230 may include an area having a lower pixel disposition density and/or lower wiring density than the surrounding area. For example, the transparent area may be replaced with the opening described above. For example, some camera modules 205 may include an under display camera (UDC). In some embodiments, some sensor modules 204 may be disposed to perform their functions without being visually exposed through the flexible display 230 in the second space 2201 of the second housing 220.

According to various embodiments, the slide-in operation and/or the slide-out operation of the electronic device 200 may be performed automatically. For example, the slide-in operation and/or the slide-out operation of the electronic device 200 may be performed through gear engagement between a driving motor (e.g., the driving motor 260 of FIG. 4A) including a pinion gear (e.g., the pinion gear 261 of FIG. 4A) disposed in a second space 2201 of the second housing 220 and a rack (e.g., the rack 2253 of FIG. 4A) disposed in the first space 2101 of the first housing 210, extending to at least a portion of the second space 2201, and including a rack gear coupled to the pinion gear 261. For example, when a processor (e.g., the processor 120 of FIG. 1) of the electronic device 200 detects a triggering signal for transitioning from a slide-in state to a slide-out state or from a slide-out state to a slide-in state, the processor may drive a driving motor (e.g., the driving motor 260 of FIG. 4A) disposed inside the electronic device 200. In one embodiment, the triggering signal may include a signal according to selection (e.g., touch) of an object displayed on the flexible display 230 or a signal according to operation (e.g., pressing) of a physical button (e.g., the key button) included in the electronic device 200.

According to various embodiments, the electronic device 200 may have a structure in which the second housing 220 slides in and/or out relative to the first housing 210 along a longitudinal direction (e.g., vertical direction) (e.g., +y-axis direction) of the electronic device 200, but is not limited thereto. For example, the electronic device 200 may have a structure in which the second housing 220 slides in and/or out relative to the first housing 210 along a width direction (e.g., horizontal direction) (e.g., the +x-axis direction) perpendicular to the longitudinal direction of the electronic device 200. In some embodiments, the electronic device 200 may be formed such that the length of the first side surface 2111 of the first housing 210 is longer than the length of the second side surface 2112. In this case, the length of the fourth side surface 2211 of the second housing 220 may also be formed to be longer than the length of the fifth side surface 2212.

According to various embodiments, the electronic device 200 may include at least one antenna A disposed through at least a portion of a second lateral member 221 of the second housing 220. In one embodiment, the electronic device 200 may include at least one unit conductive portion 310, 311, and 312 formed through at least one segmentation portion 321, 322, 323, and 324. In one embodiment, the electronic device 200 may include a first conductive portion 310 disposed through a first segmentation portion 321 and a second segmentation portion 322 spaced apart from each other by a specified interval on a fourth side surface 2211 of the second lateral member 221. In one embodiment, the electronic device 200 may include a first segmentation portion 321 and a second conductive portion 311 disposed through a third segmentation portion 323 formed on a fifth side surface 2212. In one embodiment, the electronic device 200 may include a second segmentation portion 322 and a third conductive portion 312 disposed through a fourth segmentation portion 324 formed on a sixth side surface 2213. In one embodiment, at least one conductive portion among the first conductive portion 310, the second conductive portion 311, or the third conductive portion 312 may be electrically connected to a wireless communication circuit of the electronic device 200 (e.g., the wireless communication module 192 of FIG. 1) so as to be used as at least one antenna A operating in at least one designated frequency band (e.g., the legacy band or an NR band). For example, the at least one designated frequency band may cover a range of about 600 MHz to 9000 MHz.

Figure 4A:
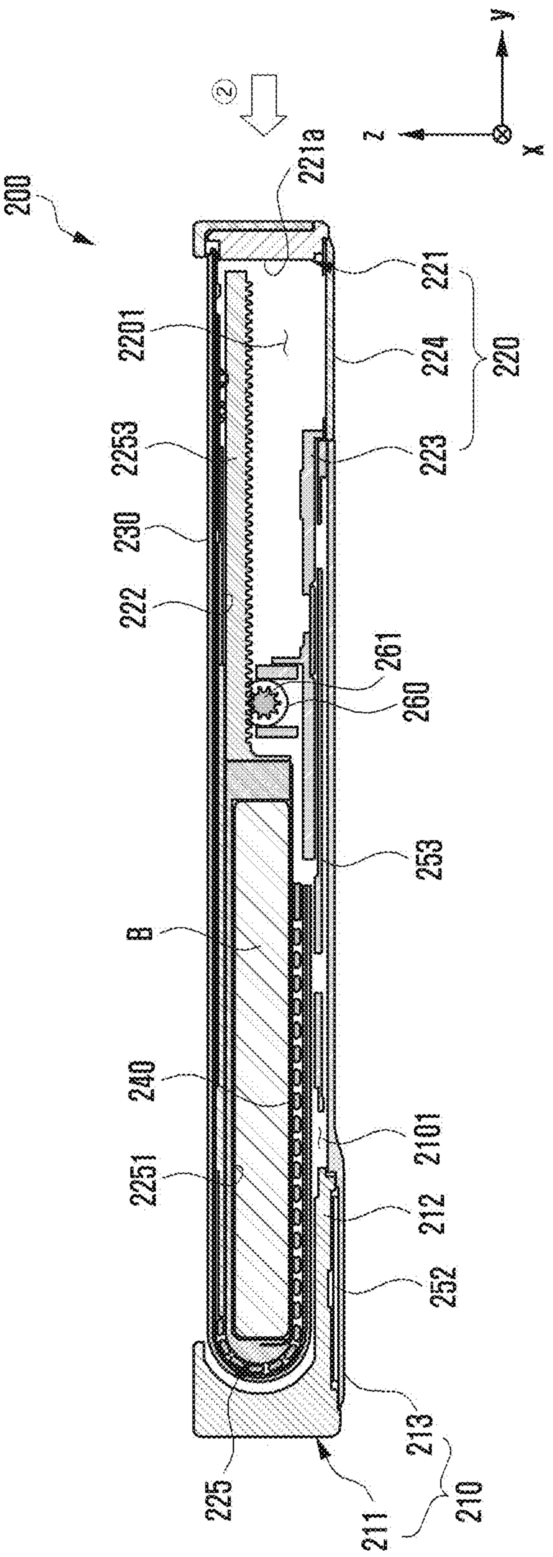
FIG. 4A is an exploded perspective view of an electronic device viewed along line 4*a*-4*a* of FIG. 2A according to an embodiment of the disclosure.

FIG. 4A is an exploded perspective view of an electronic device viewed along line 4*a*-4*a* of FIG. 2A according to an embodiment of the disclosure.

Figure 4B:
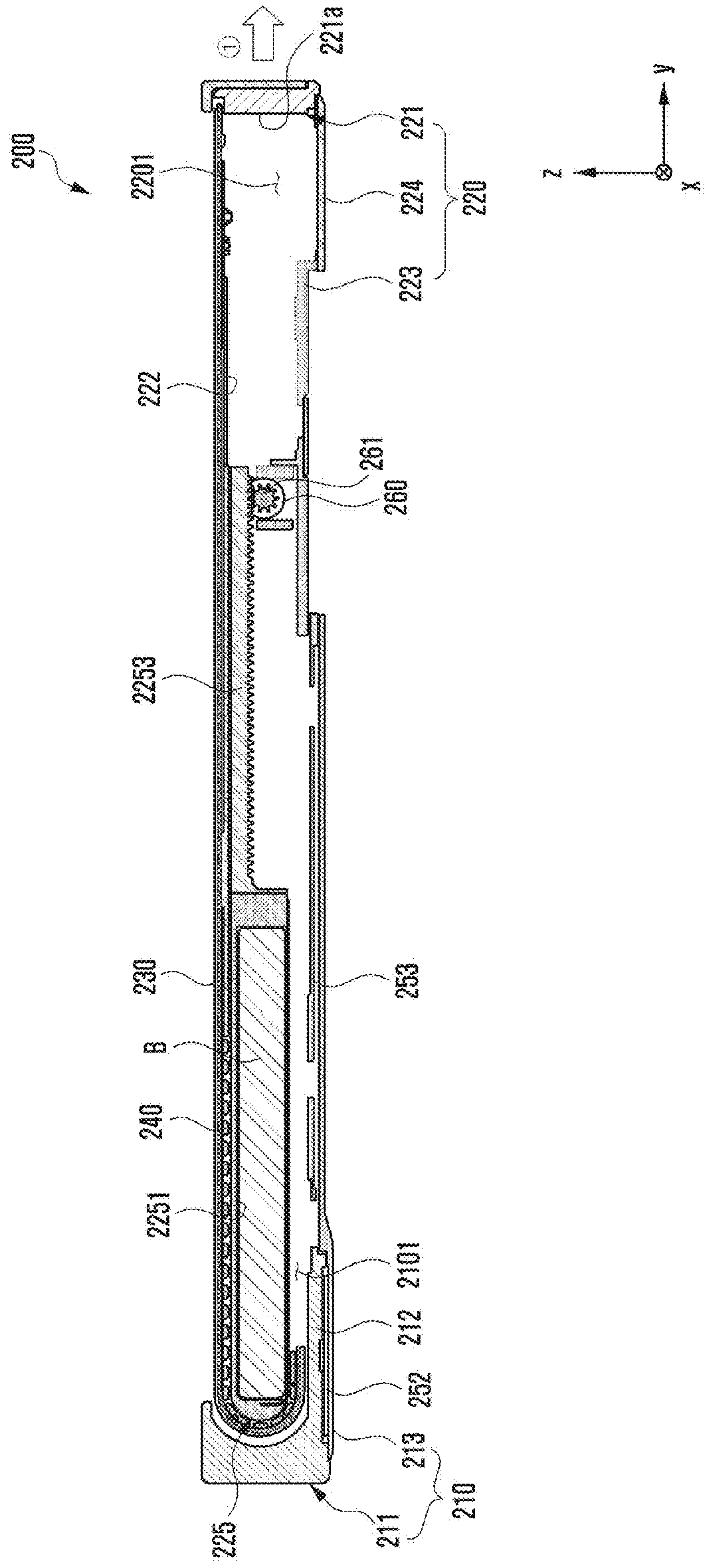
FIG. 4B is a cross-sectional view of an electronic device viewed along line 4*b*-4*b* of FIG. 3A according to an embodiment of the disclosure.

FIG. 4B is a cross-sectional view of an electronic device viewed along line 4*b*-4*b* of FIG. 3A according to an embodiment of the disclosure.

In describing the electronic device 200 of FIGS. 4A and 4B, the same reference numerals are assigned to components that are substantially the same as those of the electronic device 200 FIGS. 2A, 2B, 3A, and 3B, and detailed description thereof may be omitted.

Referring to FIGS. 4A and 4B, the electronic device 200 may include the first housing 210 having the first space 2101, the second housing 220 having the second space 2201, the support member 240 connected to the second housing 220 and at least partially accommodated in the first space 2101 in the slide-in state, the flexible display 230 provided to be supported by at least a portion of the support member 240 and at least a portion of the second housing 220, and the driving motor 260 that includes the pinion gear 261 gear-coupled to the rack 2253 fixed to the first space 2101 and extending to the second space 2201. In an embodiment, the driving motor 260 may automatically move the second housing 220 in the slide-out direction (direction ① or the slide-in direction (direction ②) based on the first housing 210 through gear coupling of the pinion gear 261 and the rack 2253. In an embodiment, the electronic device 200 may include the first rear cover 213 coupled to the first extension member 212 that extends from the first lateral member 211 of the first housing 210. In an embodiment, the electronic device 200 may include a first substrate 252 and an antenna member 253 provided in space between the first extension member 212 and the first rear cover 213. In an embodiment, the electronic device 200 may include the second rear cover 223 coupled to the second extension member 222 that extends from the second lateral member 221 and the window cover 224 coupled to a portion of the second rear cover 223.

According to various embodiments, a portion of the second housing 220 may be accommodated in the first space 2101 of the first housing 210 in the slide-in state (state of FIG. 4A) of the electronic device 200. In an embodiment, at least a portion of the flexible display 230 may be accommodated in a way of bending into the first space 2101 together with the support member 240 and accordingly, may be provided to be invisible from the outside. In this case, the first display area (e.g., display area corresponding to first portion 230*a* of FIG. 3A) of the flexible display 230 may be exposed to the outside.

According to various embodiments, at least a portion of the second housing 220 may be transitioned to the slide-out state in which it at least partially moves from the first housing 210 to the outside along the first direction (direction ① through driving of the driving motor 260. In an embodiment, the flexible display 230 may move together with the support member 240, with being supported by the support bracket 225 in the slide-out state (state of FIG. 5B) of the electronic device 200, such that a portion slid in the first space 2101 may be at least partially visible from the outside. In this case, the flexible display 230 may externally expose the second display area (e.g., display area including first portion 230*a* and second portion 230*b* of FIG. 3A) more extended than the first display area.

According to various embodiments, the electronic device 200 may include a battery (B) provided through a battery seating unit 2251 of the support bracket 225 fixed to the first space 2101 of the first housing 210. In an embodiment, the battery (B) is provided to the first housing 210 through the support bracket 225, and the thickness is extended in such a manner that it approaches or contacts the rear surface of the support member 240 from the battery seating unit 2251 of the support bracket 225. In this manner, the battery volume may relatively increase in the −z-axis direction and the support member 240 that moves in the first space 2101 may be supported.

According to an embodiment of the disclosure, in the slide-in state, the second housing 220 may move in the second direction (direction ②) and accordingly, an end portion of the rack 2253 may be positioned to contact or to be close to the upper inner surface 221*a* of the second space 2201. In an embodiment, in the slide-out state, the second housing 220 may move in the first direction (direction ① and may be provided such that the end portion of the rack 2253 moves away from the upper inner surface 221*a* of the second space 2201 and at least a portion of the rack 2253 is still supported (e.g., guided) by the second housing 220 (e.g., second extension member 222) in the second space 2201. In an embodiment, the rack 2253 may be formed to have a length corresponding to a distance from the support bracket 225 to the upper inner surface 221*a* of the second space 2201 in the slide-in state. In an embodiment, the rack 2253 may have an interlocking layout structure in which it is fixed to the first space 2101 and accommodated (e.g., guided) in the second space 2201 of the second housing 220 according to the sliding motion. This interlocking layout structure prevents the rack 2253 and the battery (B) from overlapping when viewing the side surface (e.g., second side surface 2112 or third side surface 2113) of the first housing 210 from the outside and when viewing the flexible display 230 from above, thereby maximally securing the size of the battery (B) (e.g., battery capacity) in the width direction (e.g., +x-axis direction) and/or the length direction (e.g., ty-axis direction) of the first housing 210 and helping to increase the usage time of the electronic device 200 and to improve the device reliability.

Figure 5:
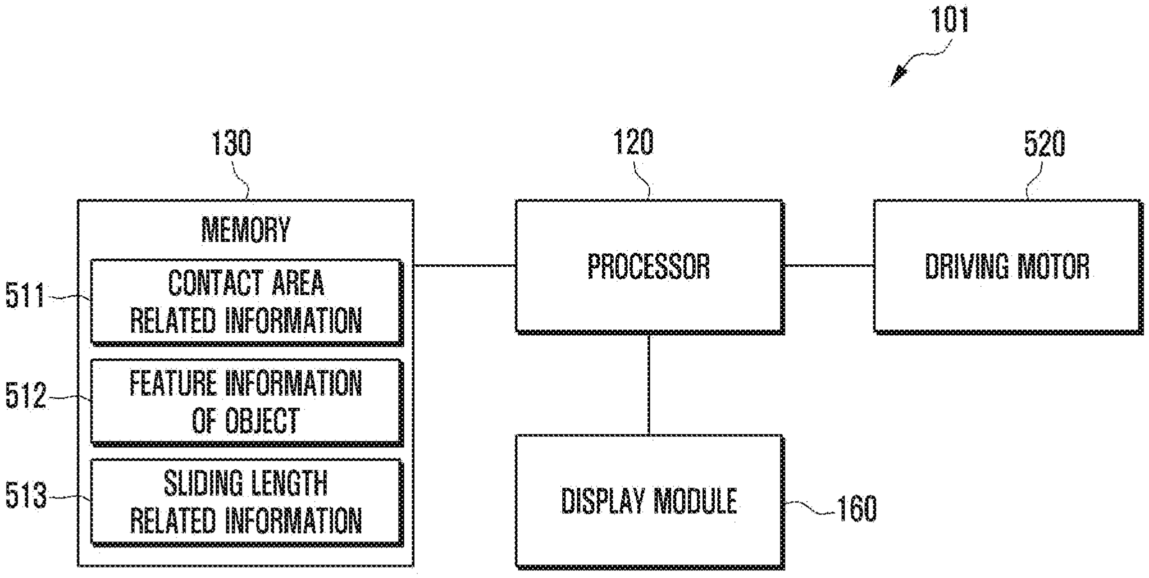
FIG. 5 is a block diagram of an electronic device according to an embodiment of the disclosure.

FIG. 5 is a block diagram of an electronic device according to an embodiment of the disclosure.

The electronic device 101 of FIG. 5 (e.g., electronic device 101 of FIG. 1) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

According to an embodiment, the electronic device 101 may include the first housing 210, the second housing 220 slidably coupled to the first housing 210 in a specified direction (e.g., direction ① of FIG. 3A or direction ② of FIG. 2A) (e.g., +y-axis direction), and the display module 160 (e.g., flexible display 230 of FIG. 2A, rollable display, expandable display, or stretchable display) provided to be supported through at least a portion of the first housing 210 and second housing 220. In an embodiment, the second housing 220 may slidably couple to the first housing 210 to slide out in the first direction (e.g., direction ① of FIG. 3A) or to slide in the second direction (e.g., direction ② of FIG. 2A) that is opposite to the first direction (direction ①) based on the first housing 210.

In an embodiment, the electronic device 200 may be changed to be in the slide-in state (e.g., retracted state) in such a manner that at least a portion of the second housing 220 is accommodated in at least a portion of the first space 2101 formed through the first housing 210. In an embodiment, the electronic device 200 may be changed to be in the slide-out state (e.g., extended state) in such a manner that at least a portion of the second housing 220 moves outwardly (e.g., direction ①) from the first space 2101.

In an embodiment, at least a portion of the flexible display 230 may be accommodated in a way of bending into the first space 2101 of the first housing 210 in the slide-in state and accordingly, may be provided to be invisible from the outside. In an embodiment, at least a portion of the flexible display 230 may slide out from the first space 2101 into an external environment in the slide-out state and accordingly, may move to be viewed from the outside.

According to an embodiment, the electronic device 101 may at least partially control the driving motor 520 (e.g., driving motor 260 of FIG. 4A) in changing from the slide-in state to the slide-out state, or changing from the slide-out state to the slide-in state. According to an embodiment, the processor 120 of the electronic device 101 may drive the driving motor 520 based on sliding length related information 513 stored in the memory 130.

Referring to FIG. 5, the electronic device 101 may include a processor (e.g., processor 120 of FIG. 1), memory (e.g., memory 130 of FIG. 1), a display module (e.g., display module 160 of FIG. 1), and/or the driving motor 520 (e.g., driving motor 260 of FIG. 4A). According to an embodiment, the memory 130 may include contact area related information 511 for a touch input of the user, feature information 512 for an object (e.g., application program) displayed through the display module 160, and sliding length related information 513 related to the sliding motion.

According to an embodiment, the processor 120 of the electronic device 101 may control at least one another component (e.g., hardware or software component) by executing instructions (e.g., program 140 of FIG. 1, program 140 of FIG. 6) stored in the memory 130, and may perform various data processing or operations. According to an embodiment, the processor 120 may be at least one of operatively, functionally, or electrically connected to at least one of the memory 130, the display module 160, or the driving motor 520.

According to an embodiment, the memory 130 may include the contact area related information 511, the feature information 512 of the object (e.g., application program), and the sliding length related information 513.

According to an embodiment, the contact area related information 511 may include information related to an area (e.g., at least one area, width, length, shape, or other area information) of a contact area according to a user input, based on the display module 160. The display module 160 may be both a flexible display at least in part and a touch display at least in part. According to an embodiment, the processor 120 may detect the user input (e.g., touch input) to the display module 160 and may identify the contact area (e.g., touch area) according to the user input. The contact area being constant may represent that a pressure of the user input is constant. The contact area being constant may include a size of the contact area being, at least one of constant, within a constant range, above a constant minimum, or below a constant maximum, that represents that the pressure of the user input is constant. The contact area increasing at a specific ratio may represent that the pressure of the user input is increasing. The specific ratio may may include, at least one a certain ratio, a range of ratios, a minimum ratio, or a maximum ratio, of increase of the contact area that represents that the pressure of the user input is increasing. The specific ratio may be preset. The contact area may represent an area of the display module 160 that a portion of the user's body (e.g., finger) contacts (e.g., touches, presses, etc.). According to an embodiment, the processor 120 may identify a change in the contact area according to the user input for a preset period of time, and may determine the type of the user input (e.g., short touch input, long touch input, force touch input) based on the contact area related information 511 stored in the memory 130.

According to an embodiment, the feature information 512 of the object (e.g., application program) may include feature information related to the object corresponding to coordinate information of the user input. For example, the processor 120 may identify coordinate information according to the user input and may identify the object (e.g., icon, item, and content corresponding to application program) corresponding to the coordinate information. The feature information 512 of the object stored in the memory 130 may include the size of the execution screen when the application program corresponding to the object is executed, and the optimized screen size when the execution screen is displayed. For example, the feature information 512 of the object may include at least one of display area related information related to the execution screen of the application corresponding to the object, information related to the sliding length determined based on the display area, and information related to driving of the driving motor 520 in which the sliding motion is performed based on the sliding length. According to an embodiment, the processor 120 may determine the size of the display area of the display module 160 based on the feature information 512 of the object and may perform the sliding motion such that the display area is determined according to the determined size. For example, when the display module 160 is in the slide-in state, the processor 120 may at least partially change the display module 160 to the slide-out state according to the determined size. As another example, when the display module 160 is in the slide-out state, the processor 120 may at least partially change the display module 160 to the slide-in state according to the determined size. According to an embodiment, the processor 120 may drive the driving motor 520 such that the display area of the display module 160 varies, based on the feature information 512 of the object.

According to an embodiment, the sliding length related information 513 may include a distance that the second housing 220 moves when performing the sliding motion in the electronic device 101. The sliding length related information 513 may include time information on a period of time for which the driving motor 520 is driven according to the set sliding length. For example, when the driving motor 520 is driven for a first period of time, the processor 120 may perform the sliding motion by the first length. Due to driving of the driving motor 520, the display module 160 may change the size of the display area.

According to an embodiment, the processor 120 may identify whether the user input is a first touch input (e.g., touch input, force touch input in which contact area increases at certain ratio) based on the contact area related information 511. In response to the user input being the first touch input, the processor 120 may identify the feature information 512 of the object corresponding to the coordinate information of the user input. The processor 120 may identify the optimized screen ratio based on the feature information 512 of the object when the application program corresponding to the object is executed. The processor 120 may drive the driving motor 520 according to the optimized screen ratio based on the sliding length related information 513. For example, the processor 120 may rotate the driving motor 520 in the first direction (e.g., clockwise) in such a manner that the display area of the display module 160 increases. As another example, the processor 120 may rotate the driving motor 520 in the second direction (e.g., counterclockwise) corresponding to the direction opposite to the first direction, in such a manner that the display area of the display module 160 decreases.

According to an embodiment, the electronic device 101 may identify the first touch input (e.g., touch input, force touch input in which contact area increases at certain ratio) that satisfies a condition for performing the sliding motion and, in response to identifying the first touch input, may output sliding content (e.g., visual indicator) for driving the driving motor 520. For example, the sliding content may include a bar graph in a bar shape, an icon, a visual indicator, visual effect information that is output based on the object, and visual effect information that is output based on the flexible display 160. The sliding content may visually indicate the degree of the user's first touch input (e.g., touch strength, touch direction, and/or touch duration). The electronic device 101 may change the display area of the display module 160 based on the user's gesture input for the sliding content. In response to a first gesture input (e.g., gesture event that changes from slide-in state to slide-out state), the electronic device 101 may drive the driving motor 520 in such a manner that the display area of the display module 160 increases. For example, the electronic device 101 may rotate the driving motor 520 along the first direction. In response a second gesture input (e.g., gesture event that changes from slide-out state to slide-in state), the electronic device 101 may drive the driving motor 520 in such a manner that the display area of the display module 160 decreases. For example, the electronic device 101 may rotate the driving motor 520 along the second direction corresponding to the direction opposite to the first direction.

According to an embodiment, the display area of the display module 160 may vary based on the state (e.g., slide-in state, slide-out state, intermediate state) of the electronic device 101. For example, in the slide-in state, the display area of the display module 160 may be reduced to a minimum size. In the slide-out state, the display area of the display module 160 may be extended to a maximum size. For example, the intermediate state may represent an intermediate state between the slide-in state and the slide-out state. The display area of the display module 160 may vary in response to driving of the driving motor 520.

According to an embodiment, the driving motor 520 may be at least partially provided within the second space 2201 of the second housing 220, and may perform the sliding motion such that the electronic device 101 may change to one of the slide-in state, the slide-out state, and the intermediate state. According to an embodiment, the electronic device 101 may at least partially drive the driving motor 520 in response to identifying the first touch input (e.g., touch input, force touch input in which contact area increases at certain ratio) that satisfies the condition for performing the sliding motion.

Figure 6:
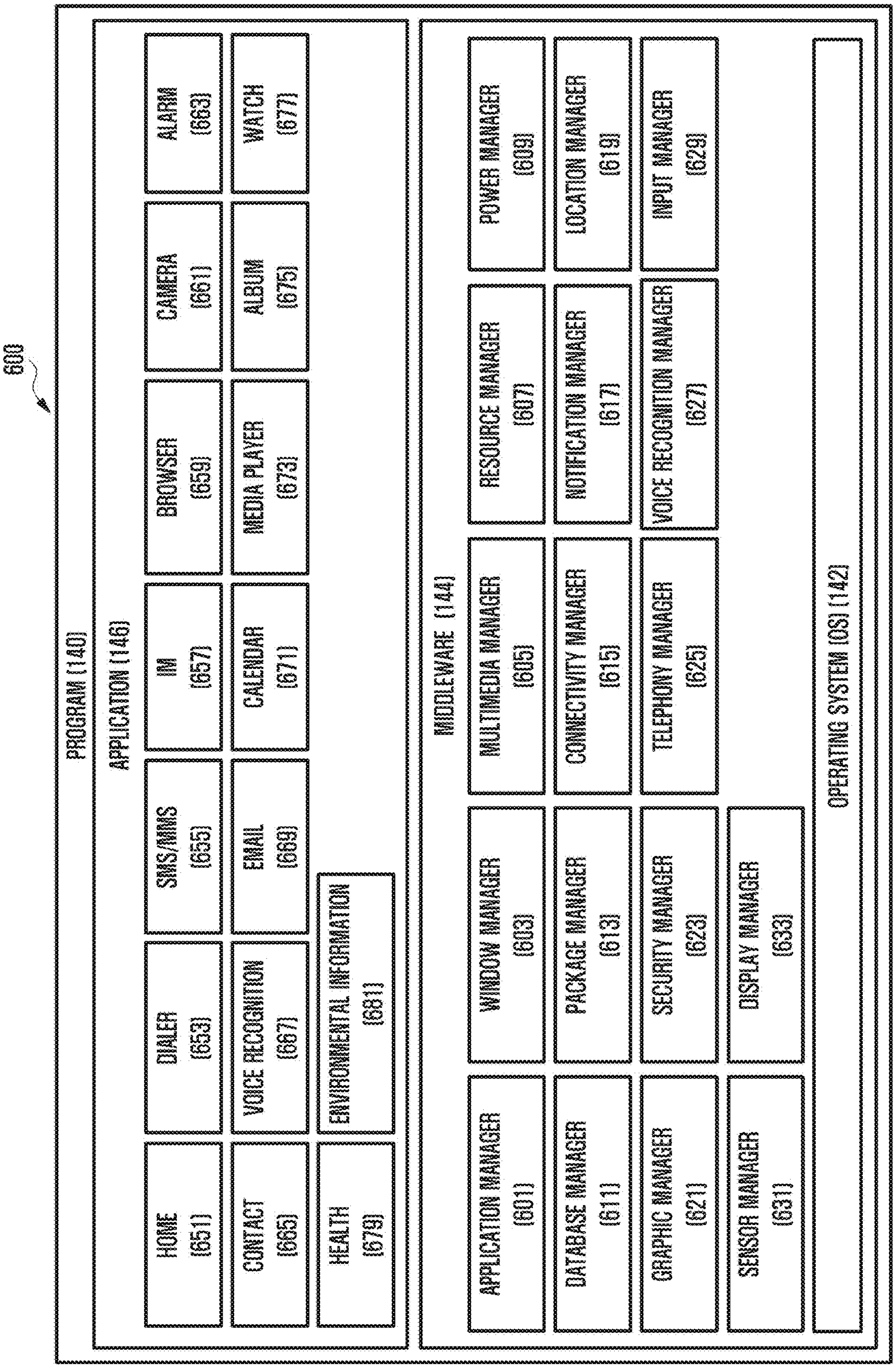
FIG. 6 is a block diagram illustrating a program according to an embodiment of the disclosure.

FIG. 6 is a block diagram 600 illustrating a program according to an embodiment of the disclosure.

The program 140 of FIG. 6 may be at least partially similar to the program 140 of FIG. 1, or may further include other embodiments of the program 140. The program 140 may include a program stored in memory (e.g., memory 130 of FIG. 1) of the electronic device (e.g., electronic device 101 of FIG. 1).

According to an embodiment, the program 140 may include an operating system (OS) (e.g., operating system (OS) 142 of FIG. 1) for controlling one or more resources of the electronic device 101, middleware (e.g., middleware 144 of FIG. 1), or an application (e.g., application 146 of FIG. 1) that may be executed in the operating system 142. The operating system 142 may include, for example, Android™, iOS™, Windows™, Symbian™, Tizen™, or Bada™. At least a portion of the program 140 may be, for example, pre-loaded to the electronic device 101 at the time of manufacture, or may be downloaded or updated from the external electronic device (e.g., electronic device 102 or 104, or server 108 of FIG. 1) when being used by the user.

The operating system 142 may control management (e.g., allocation or retrieval) of one or more system resources (e.g., function, memory, or power) of the electronic device 101. The operating system 142 may additionally or alternatively include another hardware device of the electronic device 101, for example, one or more driver programs for driving the input module 150, the sound output module 155, the display module 160, the audio module 170, the sensor module 176, the interface 177, the haptic module 179, the camera module 180, the power management module 188, the battery 189, the communication module 190, the subscriber identification module (SIM) 196, or the antenna module 197 illustrated in FIG. 1.

The middleware 144 may provide various functions to the application 146 such that functions or information provided from the one or more resources of the electronic device 101 may be used by the application 146. The middleware 144 may include, for example, an application manager 601, a window manager 603, a multimedia manager 605, a resource manager 607, a power manager 609, a database manager 611, a package manager 613, a connectivity manager 615, a notification manager 617, a location manager 619, a graphic manager 621, a security manager 623, a telephony manager 625, a voice recognition manager 627, an input manager 629, a sensor manager 631, or a display manager 633. According to an embodiment, the managers included in the middleware 144 are not limited to a specific manager, and another manager may be added or an existing manager may be deleted.

The application manager 601 may manage, for example, a lifecycle of the application 146. The window manager 603 may manage, for example, one or more GUI resources used on a screen. The multimedia manager 605 may identify one or more formats required to play back, for example, media files and may perform encoding or decoding of a corresponding media file among the media files using a codec suitable for a format selected from among the one or more formats. The resource manager 607 may manage, for example, a source code of the application 146 or storage space of the memory 130. The power manager 609 may manage, for example, capacity, temperature, or power of the battery 189, and may determine or provide related information required for the operation of the electronic device 101 using corresponding information. According to an embodiment, the power manager 609 may interact with a basic input/output system (BIOS) (not shown) of the electronic device 101.

The database manager 611 may generate, search, or change, for example, a database to be used by the application 146. The package manager 613 may manage, for example, installation or update of an application that is distributed in the form of a package file. The connectivity manager 615 may manage, for example, a wireless connection or a direct connection between the electronic device 101 and the external electronic device (102, 104, server 108). The notification manager 617 may provide, for example, a function for notifying occurrence of a specified event (e.g., incoming call, message, or alarm) of the user. The location manager 619 may manage, for example, location information of the electronic device 101. The graphic manager 621 may manage, for example, one or more graphic effects to be provided to the user or a user interface related thereto.

The security manager 623 may provide, for example, a system security or a user authentication. The telephony manager 625 may manage, for example, a voice call function or a video call function provided by the electronic device 101. The voice recognition manager 627 may transmit, for example, voice data of the user to the server 108 and may receive, from the server 108, a command corresponding to a function to be performed by the electronic device 101 based on at least a portion of the voice data or text data converted based on at least a portion of the voice data.

The input manager 629 may manage, for example, coordinate information of the touch input and contact area information according to the touch input, based on the touch input that is input through the display module 160. The sensor manager 631 may detect and manage, for example, events that occur in various sensor devices (e.g., sensor module 176 of FIG. 1). The display manager 633 may identify the first display area in the slide-in state and the second display area in the slide-out state, and may manage the operation of displaying content based on the size of the identified display area.

According to an embodiment, the middleware 144 may dynamically delete some of the existing components or may add new components. According to an embodiment, at least a portion of the middleware 144 may be included as a portion of the operating system 142, or may be implemented as separate software from the operating system 142.

The application 146 may include, for example, an application related to at least one of a home 651, a dialer 653, an SMS/MMS 655, an instant message (IM) 657, browser 659, a camera 661, alarm 663, contact 665 (e.g., contact information), voice recognition 667, an email 669, a calendar 671, a media player 673, an album 675, a watch 677, health 679 (e.g., measuring biometric information such as amount of exercise or blood sugar), or environmental information 681 (e.g., measuring barometric pressure, humidity, or temperature information).

According to an embodiment, the application 146 may further include an information exchange application (not shown) that may support information exchange between the electronic device 101 and the external electronic device (102, 104, 108). The information exchange application may include, for example, a notification relay application configured to deliver specified information (e.g., call, message, or alarm) to the external electronic device (102, 104, 108), or a device management application configured to manage the external electronic device (102, 104, 108).

The notification relay application may deliver, for example, notification information corresponding to a specified event (e.g., mail reception) that occurred in another application (e.g., email application 669) of the electronic device 101 to the external electronic device. Additionally or alternatively, the notification relay application may receive notification information from the external electronic device (102, 104, 108), and may provide the same to the user of the electronic device 101. The device management application may control, for example, power (e.g., turn-on or turn-off) or function (e.g., brightness, resolution, or focus) of the external electronic device (102, 104, 108) communicating with the electronic device 101 or some components (e.g., display module or camera module of external electronic device) thereof. The device management application may additionally or alternatively support installation, deletion, or update of the application in the external electronic device (102, 104, 108).

According to an embodiment, the program 140 may include a program that constitutes the home screen of the electronic device 101. For example, the package manager 613 included in the middleware 144 may manage a package file (e.g., home screen package file) generated based on data and attribute information related to the configuration of the home screen. According to an embodiment, the electronic device 101 may generate the home screen based on a package file related to the configuration of the home screen and may display the generated home screen through the display (e.g., display module 160 of FIG. 1). For example, the home screen may include content (e.g., icon, item) corresponding to an application program (e.g., application 146) installed in the memory 130. According to an embodiment, the content may include sliding content (e.g., visual indicator) representing the sliding length in relation to the sliding motion of the electronic device 101.

According to an embodiment, the electronic device (e.g., electronic device 101 of FIG. 1) may include a first housing (e.g., first housing 210 of FIG. 2A), a second housing (e.g., second housing 220 of FIG. 2A) configured to slidably couple to the first housing 210, a flexible display (e.g., display module 160 of FIGS. 1 and 5) of which a display area varies based on a sliding motion of the second housing 220, a driving motor (e.g., driving motor 260 of FIG. 4A, driving motor 520 of FIG. 5) configured to control the sliding motion of the second housing 220, memory (e.g., memory 130 of FIGS. 1 and 5) storing instructions, and at least one processor (e.g., the processor 120) operatively connected to the flexible display 160, the driving motor 520, and the memory 130. The instructions, when executed by the at least one processor (e.g., processor 120) individually or collectively, may cause the electronic device to detect a touch input event for an object displayed through the flexible display 160. In response to detecting the touch input event, the processor 120 may identify whether the touch input event satisfies a sliding condition. When the touch input event satisfies the sliding condition, the processor 120 may output sliding content corresponding to the object. The processor 120 may drive the driving motor 520 such that the display area of the flexible display 160 varies based on the sliding content.

According to an embodiment, the instructions, when executed by the at least one processor (e.g., processor 120) individually or collectively, may cause the electronic device to identify whether the touch input event is a first touch input that satisfies the sliding condition, when the touch input event is the first touch input that satisfies the sliding condition, acquire feature information of the object, and output the sliding content based on the acquired feature information of the object. The first touch input may include a force touch input that applies a pressure of greater than or equal to a predetermined magnitude such that a change in a touch area according to the touch input event exceeds a set threshold.

According to an embodiment, the instructions, when executed by the at least one processor (e.g., processor 120) individually or collectively, may cause the electronic device to, when the touch input event is a second touch input that does not satisfy the sliding condition, the processor 120 may execute an application corresponding to the object, and display an execution screen of the application corresponding to the object based on the flexible display 160. The second touch input may include at least one of a force touch input that applies a pressure of a magnitude such that a change in a touch area according to the touch input event does not exceed a set threshold, a short touch input that is input for less than a set period of time, or a long touch input that is input for greater than or equal to the set period of time.

According to an embodiment, the instructions, when executed by the at least one processor (e.g., processor 120) individually or collectively, may cause the electronic device to identify the change in a touch area according to the touch input event, and when the change in the touch area for a unit time exceeds a set threshold, determine the touch input event as the first touch input that satisfies the sliding condition.

According to an embodiment, the feature information of the object includes at least one of display area related information related to an execution screen of an application corresponding to the object, information related to a sliding length determined based on the display area, or information related to driving of the driving motor of which sliding motion is performed based on the sliding length.

According to an embodiment, the instructions, when executed by the at least one processor (e.g., processor 120) individually or collectively, may cause the electronic device to identify a gesture input for the sliding content, determine the sliding length based on the identified gesture input, and at least partially drive the driving motor 520 based on the determined sliding length.

According to an embodiment, the instructions, when executed by the at least one processor (e.g., processor 120) individually or collectively, may cause the electronic device to identify a gesture input for the sliding content, in response to identifying the gesture input, identify a sliding direction and a sliding length based on the sliding length related information 513 stored in the memory 130, identify a rotation direction and a driving time of the driving motor 520 based on the identified sliding direction and sliding length, and at least partially drive the driving motor 520 based on the identified rotation direction and driving time.

According to an embodiment, the sliding content may include at least one of a bar graph in a bar shape, an icon, a visual indicator, visual effect information that is output based on the object, or visual effect information that is output based on the flexible display 160.

According to an embodiment, the instructions, when executed by the at least one processor (e.g., processor 120) individually or collectively, may cause the electronic device to identify a sliding distance set in correspondence to the object based on the feature information of the object, and drive the driving motor 520 based on the set sliding distance. In response to execution of an application corresponding to the object, the set sliding distance may be set based on an execution screen of the application.

According to an embodiment, the instructions, when executed by the at least one processor (e.g., processor 120) individually or collectively, may cause the electronic device to display a configuration information option related to the sliding condition, and change the sliding condition based on the configuration information option.

According to an embodiment, the instructions, when executed by the at least one processor (e.g., processor 120) individually or collectively, may cause the electronic device to, in response to the touch input event satisfying the sliding condition, unlock a lock mode related to the sliding motion, and. in response to unlocking the lock mode, output a feedback signal.

According to an embodiment, the electronic device 101 may further include a second housing configured to slidably couple to the first housing along a first direction, a third housing configured to slidably couple to the first housing along a second direction corresponding to a direction opposite to the first direction, and a driving motor configured to control the sliding motion of the second housing and the third housing. The instructions, when executed by the at least one processor (e.g., processor 120) individually or collectively, may cause the electronic device to, when the touch input event satisfies the sliding condition, the processor 120 may drive the driving motor 520 such that the sliding motion is performed based on the second housing according to the first direction and the third housing according to the second direction.

According to an embodiment, the instructions, when executed by the at least one processor (e.g., processor 120) individually or collectively, may cause the electronic device to identify a sliding condition set based on the object, and in response to detecting the touch input event for the object, the processor 120 may identify whether the touch input event satisfies the identified sliding condition.

Figure 7:
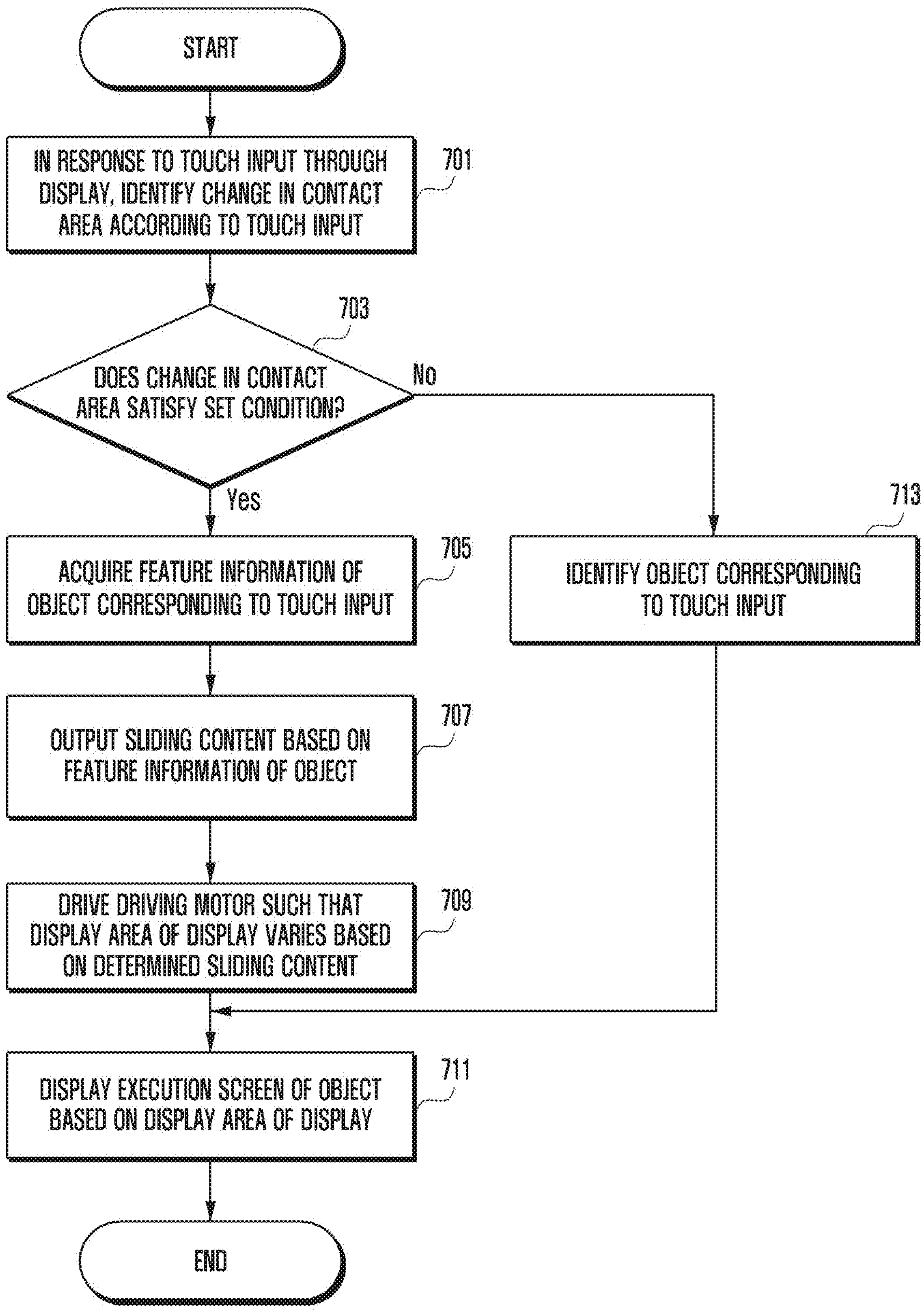
FIG. 7 is a flowchart illustrating a method of driving a driving motor according to an embodiment of the disclosure.

FIG. 7 is a flowchart illustrating a method of driving a driving motor according to an embodiment of the disclosure.

In the following embodiment, each of operations may be sequentially performed, but is not necessarily performed sequentially. For example, the order of each of the operations may be changed and at least two operations may be performed in parallel.

According to an embodiment, operations 701 to 711 may be understood to be performed by a processor (e.g., processor 120 of FIGS. 1 and 5) of an electronic device (e.g., electronic device 101 of FIGS. 1 and 5).

The electronic device 101 of FIG. 7 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

According to an embodiment, the electronic device 101 may include the first housing 210, the second housing 220 slidably coupled to the first housing 210 in a specified direction (e.g., direction ① of FIG. 3A or direction ② of FIG. 2A) (e.g., +y-axis direction), and the display module 160 (e.g., flexible display 230 of FIG. 2A, rollable display, expandable display, or stretchable display) provided to be supported through at least a portion of the first housing 210 and the second housing 220. In an embodiment, the second housing 220 may slidably couple to the first housing 210 to slide out in the first direction (e.g., direction ① of FIG. 3A) or to slide in the second direction (e.g., direction ② of FIG. 2A) that is opposite to the first direction (direction ①) based on the first housing 210.

In an embodiment, the electronic device 200 may be changed to be in the slide-in state (e.g., retracted state) in such a manner that at least a portion of the second housing 220 is accommodated in at least a portion of the first space 2101 formed through the first housing 210. In an embodiment, the electronic device 200 may be changed to be in the slide-out state (e.g., extended state) in such a manner that at least a portion of the second housing 220 moves outwardly (e.g., direction ①) from the first space 2101.

According to an embodiment, the electronic device 101 may perform the sliding motion of changing from the slide-in state to the slide-out state, or changing from the slide-out state to the slide-in state. For example, the electronic device 101 may perform the sliding motion by at least partially controlling the driving motor 520 (e.g., driving motor 260 of FIG. 4A). According to an embodiment, the processor 120 of the electronic device 101 may drive the driving motor 520 based on the sliding length related information (e.g., sliding length related information 513 of FIG. 5) stored in the memory 130.

In operation 701, in response to a touch input through a display (e.g., flexible display 230, display module 160), the processor 120 (e.g., processor 120 of FIG. 5) of the electronic device 101 may identify a change in a contact area of the touch input. For example, the electronic device 101 may operate in one of a slide-in state, a slide-out state, and an intermediate state corresponding to the middle between the slide-in state and the slide-out state, and the display may be at least partially activated. The processor 120 may detect the touch input of the user to the display, and may identify coordinate information and information related to the contact area according to the touch input of the user. For example, if the contact area according to the touch input increases at a certain ratio, it may indicate that a pressure is increasingly applied to the touch input. For example, the touch input to which the pressure exceeds a magnitude may represent a force touch input. The magnitude may be a predetermined magnitude.

According to an embodiment, the electronic device 101 may further include a pressure sensor, and may identify pressure information of the user input through the display based on the pressure sensor. For example, the electronic device 101 may acquire pressure information according to the touch input using the pressure sensor, and may determine whether the touch input is the force touch input based on the acquired pressure information. According to an embodiment, determining whether the touch input is the force touch input may not be limited to a specific method.

In operation 703, the processor 120 may determine whether a change in the contact area satisfies a set condition. For example, the processor 120 may identify the change in the contact area for a set period of time and may determine whether the set condition is satisfied based on the identified change in the contact area. If the set condition is satisfied, the touch input may be determined as the first touch input. For example, the first touch input may include a user input of which a contact area increases at a specific ratio. The contact area increasing at the specific ratio may represent that the pressure of the touch input is increasing. The first touch input may correspond to a force touch input (e.g., touch input that applies pressure exceeding set threshold). According to an embodiment, when the change in the contact area satisfies the set condition, the processor 120 may determine that the force touch input has occurred.

According to an embodiment, when the change in the contact area satisfies the set condition, the processor 120 may unlock a lock mode related to the sliding motion and, in response to unlocking the lock mode, may output a feedback signal (e.g., visual effect, tactile effect, auditory effect). For example, the electronic device 101 may be in a state in which the lock mode is set in relation to the sliding motion. In the state in which the lock mode related to the sliding motion is set, the electronic device 101 may deactivate the driving motor 520 such that the sliding motion is not performed. According to an embodiment, in response to unlocking the lock mode, the processor 120 may output the feedback signal and may provide the user with notification information on performing the sliding motion. In response to unlocking the lock mode, the processor 120 may at least partially activate the driving motor 520.

When the change in the contact area satisfies the set condition in operation 703 (e.g., when touch input is force touch input), the processor 120 may acquire feature information of an object corresponding to the touch input in operation 705. For example, the processor 120 may identify coordinate information of the flexible display 230 corresponding to the touch input and may identify an object (e.g., content, icon, item for executing application program) corresponding to the identified coordinate information. The processor 120 may acquire the identified feature information of the object. For example, the feature information of the object may include an optimized screen ratio (e.g., screen size) when the application corresponding the object is executed, a set screen ratio (e.g., screen size), and a screen ratio in a current state (e.g., screen size).

In operation 707, the processor 120 may output sliding content based on the feature information of the object. For example, the sliding content may include a visual indicator that represents the sliding length according to the sliding motion. The sliding content may include an icon that represents the size of the display area of the flexible display 230. For example, the sliding content may be implemented as an icon in a bar shape (e.g., bar), or may be implemented in a way of outputting highlight effect based on a set area (e.g., partial area, edge area of flexible display 230). According to an embodiment, the processor 120 may visually display the degree of touch input by the user (e.g., touch strength, touch power, touch direction, and/or touch duration) based on the sliding content. For example, the processor 120 may reflect the visual effect in such a manner that the length of a bar-shaped icon (e.g., bar graph) increases or decreases. According to an embodiment, the sliding content is not limited to the icon and effect that are visually output, and may also include an auditory audio signal and a tactile vibration (e.g., haptic) signal.

In operation 709, the processor 120 may drive the driving motor 520 such that the display area of the display varies based on the output sliding content. For example, the processor 120 may identify the set sliding length based on the feature information of the object, and may output the sliding content that represents the identified sliding length. The processor 120 may drive the driving motor 520 such that the sliding motion is performed based on the sliding content. For example, when the object corresponds to a first application, the processor 120 may output sliding content according to a set screen ratio (e.g., optimized screen ratio) when displaying an execution screen of the first application through the display. The processor 120 may drive the driving motor 520 such that the display area of the display matches the set screen ratio. When driving the driving motor 520, the display area of the display may vary.

According to an embodiment, the electronic device 101 may select a first touch input (e.g., force touch input) from among touch inputs of the user and, when executing the first application according to the first touch input, may display the execution screen of the first application based on a screen ratio set in correspondence to the first application (e.g., optimized screen ratio). The electronic device 101 may at least partially drive the driving motor 520 such that the set screen ratio is implemented.

In operation 711, the processor 120 may display the execution screen of the object based on the display area of the display. For example, when the driving motor 520 is driven in operation 709, the display area of the display area may vary. In operation 711, the processor 120 may display the execution screen of the object based on the changed display area.

When the change in the account area does not satisfy the set condition in operation 703 (e.g., when touch input is short touch input or long touch input), the processor 120 may identify the object (e.g., application program) corresponding to the touch input in operation 713. For example, the processor 120 may identify the application program corresponding to the object. In operation 711, the processor 120 may display the execution screen of the object based on the display area of the display. According to an embodiment, when the touch input of the user does not satisfy the set condition (e.g., when touch input is not input that applies pressure), the electronic device 101 may display the execution screen corresponding to the object through the display while not performing the sliding motion.

Figure 8:
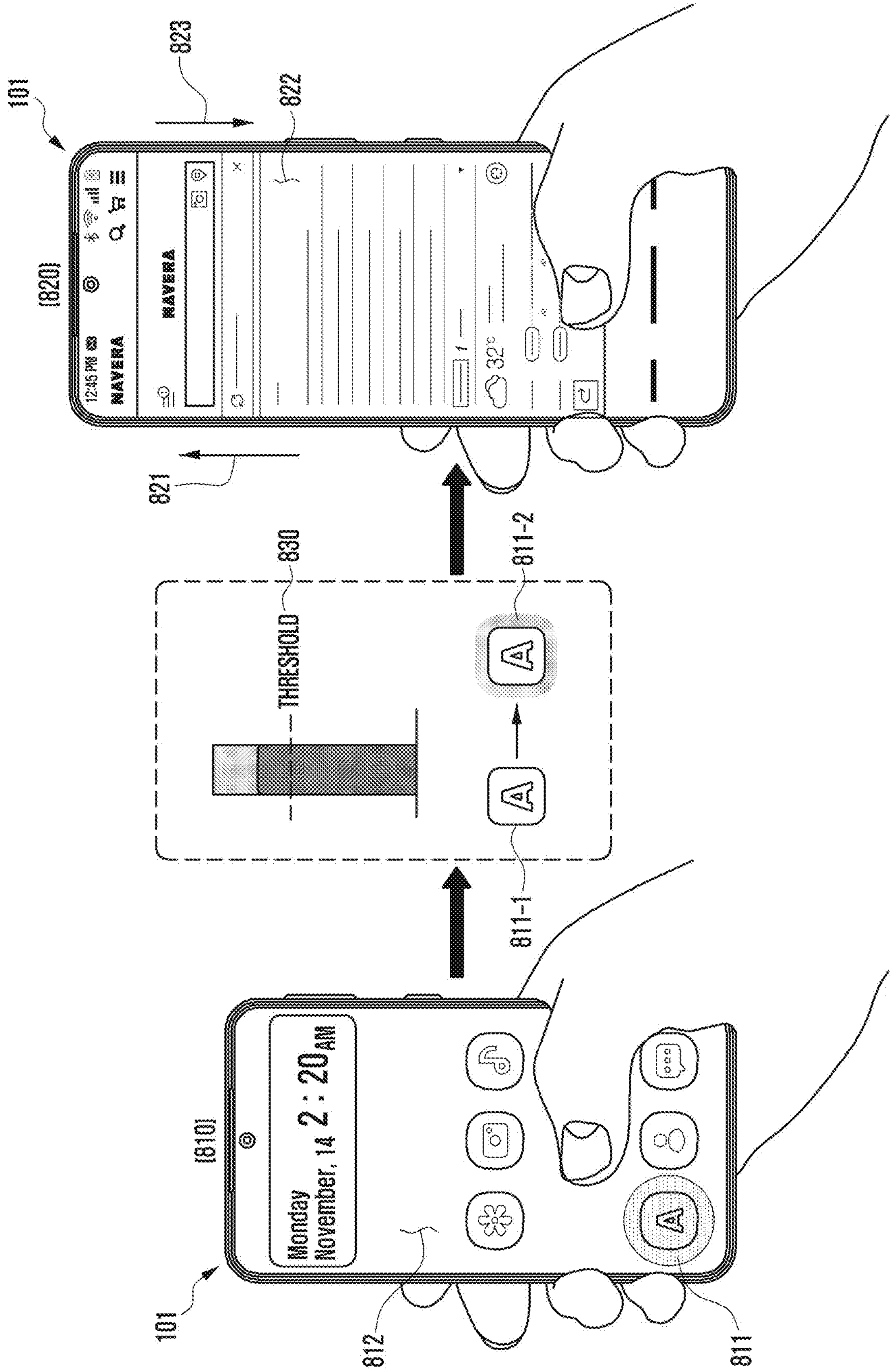
FIG. 8 is a diagram illustrating a method of driving a driving motor in response to a first touch input of a user according to an embodiment of the disclosure.

FIG. 8 is a diagram illustrating a method of driving a driving motor in response to a first touch input of a user according to an embodiment of the disclosure.

The electronic device 101 of FIG. 8 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

According to an embodiment, the electronic device 101 may include the first housing 210, the second housing 220 slidably coupled to the first housing 210 in a specified direction (e.g., direction ① of FIG. 3A or direction ② of FIG. 2A) (e.g., +y-axis direction), and the display module 160 (e.g., flexible display 230 of FIG. 2A, rollable display, expandable display, or stretchable display) provided to be supported through at least a portion of the first housing 210 and the second housing 220. In an embodiment, the second housing 220 may slidably couple to the first housing 210 to slide out in the first direction (e.g., direction ① of FIG. 3A) or to slide in the second direction (e.g., direction ② of FIG. 2A) that is opposite to the first direction (direction ①) based on the first housing 210.

Referring to FIG. 8, the electronic device 101 may operate in a slide-in state 810 in which at least a portion of the second housing 220 is accommodated in at least a portion of the first space 2101 formed through the first housing 210. For example, the electronic device 101 in the slide-in state 810 may display a home screen based on a first display area 812. The home screen may include at least one object 811 (e.g., icon, item, widget content) corresponding to an application program.

With reference to FIG. 8, a processor (e.g., processor 120 of FIG. 1) of the electronic device 101 may detect a touch input (e.g., touch input event) for at least one object 811, and may determine whether the touch input satisfies a set condition (e.g., condition that contact area of touch input increases according to set ratio, occurrence condition of force touch input, condition that pressure exceeding set threshold 830 is applied for set period of time). If the touch input satisfies the set condition, the touch input may correspond to a force touch input (e.g., touch input that applies pressure). For example, when the set condition is satisfied, the processor 120 may reflect visual effect (e.g., sliding content) to a first object 811-1 and may display the same with a second object 811-2. As another example, an object that does not support the sliding motion may be displayed in the form of the first object 811-1, and an object that supports the sliding motion may be displayed in the form of the second object 811-2. With reference to FIG. 8, the threshold 830 is illustrated in relation to the pressure of the touch input, but it may be replaced with the set ratio of the contact area. For example, when the change in the contact area of the touch input during a unit time exceeds the set ratio (e.g., set threshold), it may be interpreted that the touch input satisfies the set condition.

Referring to FIG. 8, the electronic device 101 may operate based on a slide-out state 820 in which at least a portion of the second housing 220 is exposed to an external environment from the first space 2101 formed through the first housing 210. For example, the electronic device 101 in the slide-out state 820 may display a home screen based on a second display area 822. For example, the first display area 812 of the slide-in state 810 may be relatively smaller than the second display area 822 of the slide-out state 820. According to an embodiment, the electronic device 101 may perform the sliding motion (e.g., slide-out operation) along a first direction 821 in the slide-in state 810 and may be changed to be in the slide-out state 820. According to an embodiment, the electronic device 101 may perform the sliding motion (e.g., slide-in operation) along a second direction 823 in the slide-out state 820 and may be changed to be in the slide-in state 810.

According to an embodiment, in response to a touch input event through the display module 160, the electronic device 101 may identify whether the touch input event is a first touch input (e.g., force touch input) that satisfies a sliding condition. When the touch input event corresponds to the first touch input, the electronic device 101 may acquire feature information of the object corresponding to the first touch input (e.g., display area related information related to execution screen of application corresponding to object, information related to sliding length that is determined based on display area, and information related to driving of driving motor 520 that performs sliding motion based on sliding length). The electronic device 101 may drive the driving motor (e.g., driving motor 520 of FIG. 5) such that the display area of the display module 160 varies based on the feature information of the object.

Figure 9:
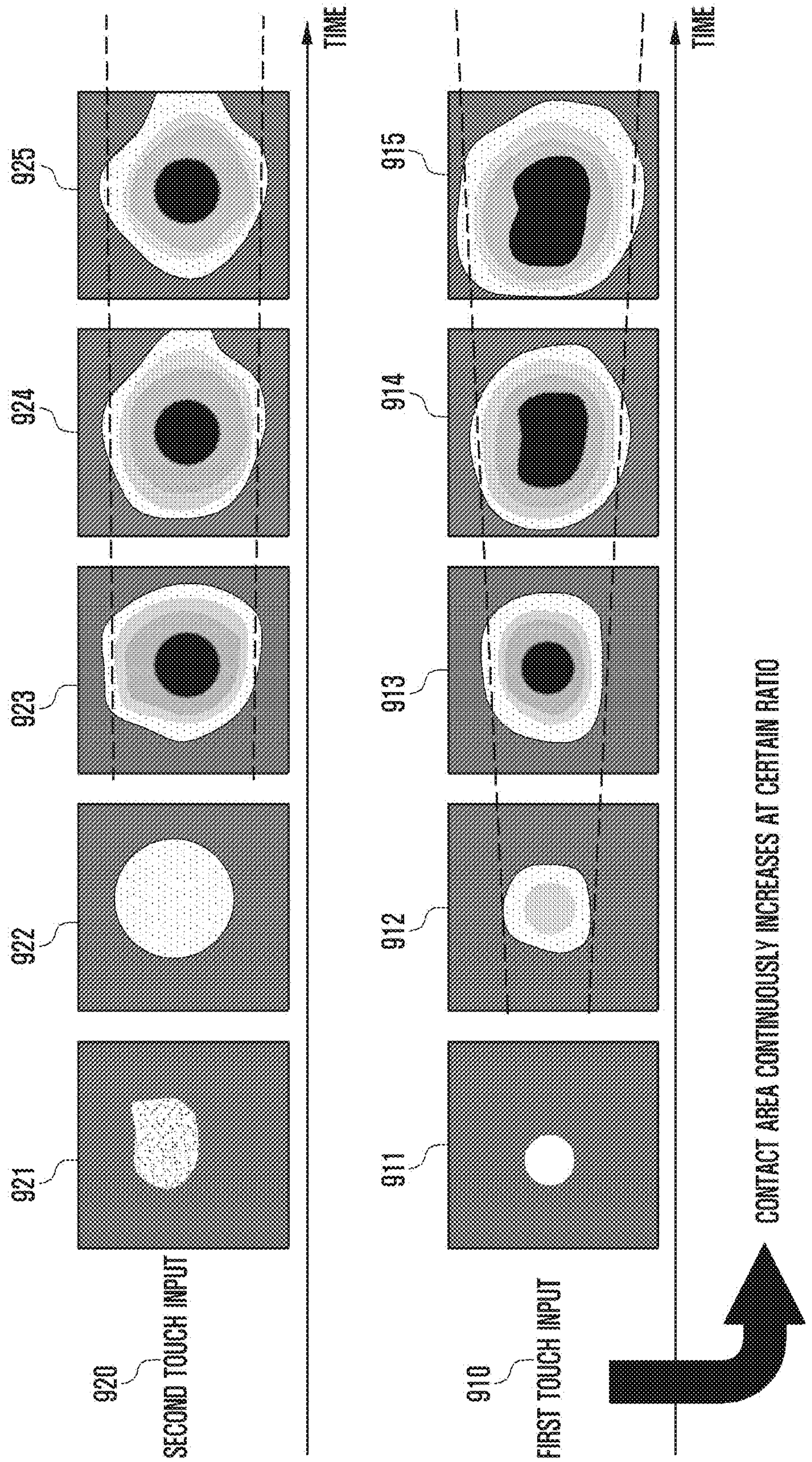
FIG. 9 is a diagram illustrating a method of distinguishing a first touch input and a second touch input according to an embodiment of the disclosure.

FIG. 9 is a diagram illustrating a method of distinguishing a first touch input and a second touch input according to an embodiment of the disclosure.

The electronic device 101 of FIG. 9 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

According to an embodiment, the electronic device 101 may include the display module 160 (e.g., flexible display 230 of FIG. 2A, rollable display, expandable display, or stretchable display) provided to be supported through at least a portion of the first housing 210 and the second housing 220. A processor (e.g., processor 120 of FIG. 1) of the electronic device 101 may detect a touch input of the user to the display module 160 and may determine whether the touch input is a first touch input 910 or a second touch input 920. For example, the first touch input 910 may include a force touch input in which an area of contact of the touch input to the display module 160 increases at a specific ratio for a set period of time. The second touch input 920 may include at least one of a force touch input that applies a pressure of a magnitude such that the change in the touch area does not exceed a set threshold, a short touch input that is input for less than the set period of time, or a long touch input that is input for greater than or equal to the set period of time.

The first touch input 910 illustrated in FIG. 9 may include touch inputs 911, 912, 913, 914, and 915 (e.g., force touch input) each in which the contact area continuously increases at a certain ratio for a set period of time. The second touch input 920 illustrated in FIG. 9 may include touch inputs 921, 922, 923, 924, and 925 (e.g., short touch input, long touch input) in which the contact area is maintained within a constant range at the set time interval.

According to an embodiment, the electronic device 101 may select the first touch input 910 (e.g., force touch input) from among touch inputs of the user detected through the display module 160 and, in response to selecting the first touch input 910, may perform the sliding motion. For example, the electronic device 101 may perform the sliding motion by at least partially driving a driving motor (e.g., driving motor 520 of FIG. 5). The electronic device 101 may change from the slide-in state to the slide-out state, or may change from the slide-out state to the slide-in state based on driving of the driving motor 520.

According to an embodiment, the electronic device 101 may select the second touch input 920 for the object displayed through the display module 160 and, in response to the second touch input 920, may execute an application corresponding to the object. For example, when the second touch input 920 is identified, the electronic device 101 may execute an execution screen of the application corresponding to the object while not performing the sliding motion. The electronic device 101 may display the execution screen of the application in a state in which the display area of the display module 160 is not changed (e.g., state in which driving motor 520 is not driven).

Figure 10:
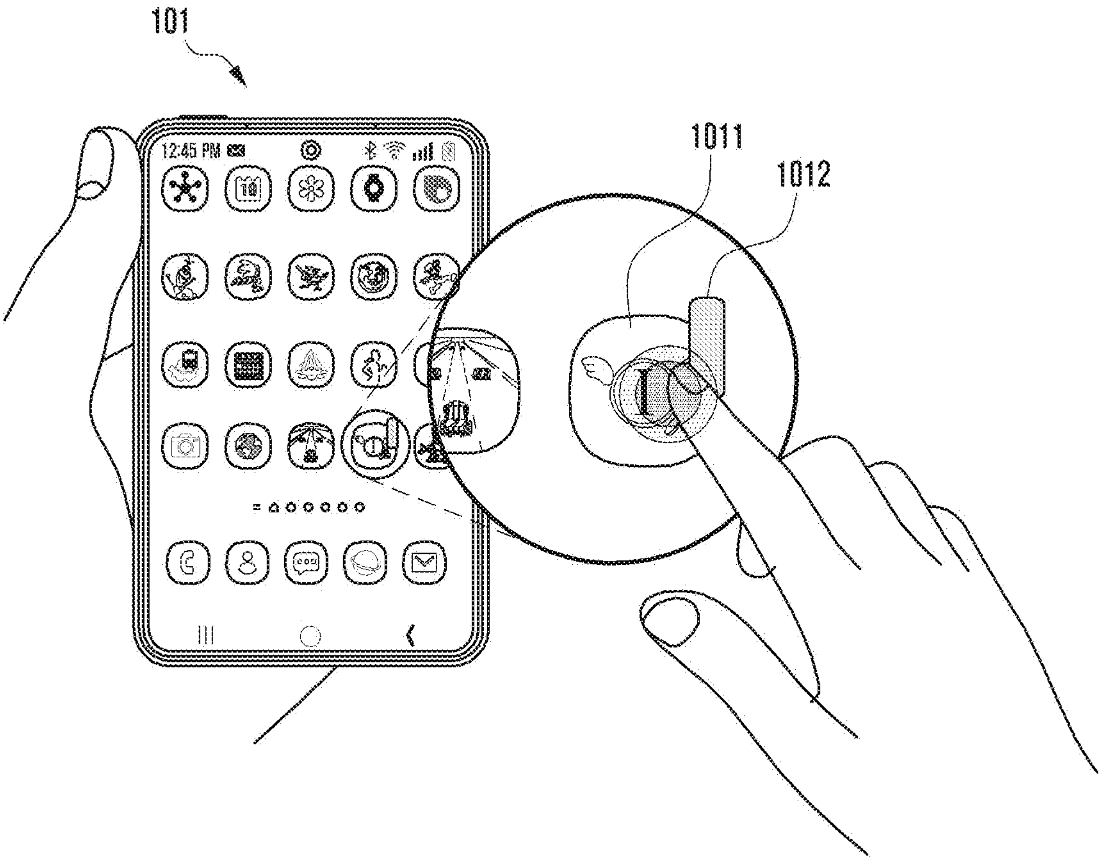
FIG. 10 is a diagram illustrating a method of outputting sliding content in response to detecting a first touch input according to an embodiment of the disclosure.

FIG. 10 is a diagram illustrating a method of outputting sliding content in response to detecting a first touch input according to an embodiment of the disclosure.

The electronic device 101 of FIG. 10 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

Referring to FIG. 10, the electronic device 101 may display a home screen through the display module 160 (e.g., flexible display 230 of FIG. 2A, rollable display, expandable display, or stretchable display), and may detect a touch input of the user. For example, the home screen may include at least one object 1011 (e.g., icon, item, content, widget content) corresponding to an application program installed in memory (e.g., memory 130 of FIG. 1).

According to an embodiment, a processor (e.g., processor 120 of FIG. 1) of the electronic device 101 may determine whether to perform the sliding motion based on feature information of the object 1011 (e.g., feature information of application program corresponding to object 1011). For example, when the sliding motion is required to execute the application program corresponding to the object 1011, the processor 120 may display sliding content 1012 (e.g., visual indicator) to indicate a sliding length according to the sliding motion. The processor 120 may display the sliding content 1012 in the form in which the sliding content 1012 at least partially overlaps, based on the object 1011. As another example, when the sliding motion is not required to execute the application program corresponding to the object, the processor 120 may not output the sliding content 1012. According to an embodiment, the object 1011 with the sliding motion set may be output together with the sliding content 1012, but the sliding content 1012 may not be output for an object without the sliding motion set.

According to an embodiment, the processor 120 may detect a first touch input (e.g., force touch input) for the object 1011 and, in response to detecting the first touch input, may output the sliding content 1012. According to another embodiment, when displaying the object 1011 on the home screen, in the case of the object that requires the sliding motion (e.g., object of application program that supports sliding motion, object of application program to which sliding motion is set), the processor 120 may also display the object 1011 and the sliding content 1012.

Figure 11:
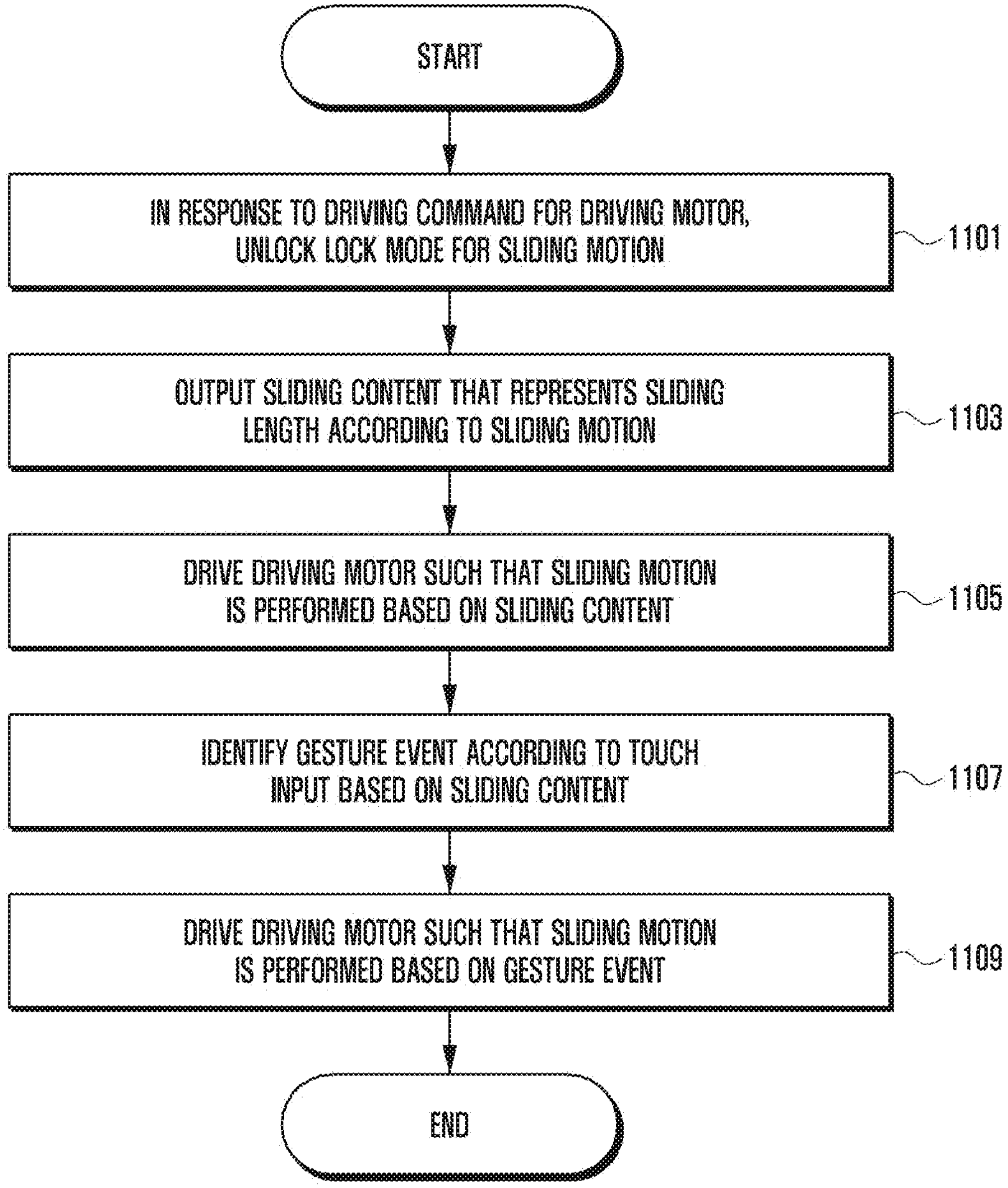
FIG. 11 is a diagram illustrating a method of driving a driving motor based on sliding content according to an embodiment of the disclosure.

FIG. 11 is a diagram illustrating a method of driving a driving motor based on sliding content according to an embodiment of the disclosure.

In the following embodiment, each of operations may be sequentially performed, but is not necessarily performed sequentially. For example, the order of each of the operations may be changed and at least two operations may be performed in parallel.

According to an embodiment, operations 1101 to 1109 may be understood to be performed by a processor (e.g., processor 120 of FIGS. 1 and 5) of an electronic device (e.g., electronic device 101 of FIGS. 1 and 5). Operations 1101 to 1109 may be included as detailed operations of operation 709 of FIG. 7.

The electronic device 101 of FIG. 11 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210, second housing 220 of FIG. 2A).

According to an embodiment, the electronic device 101 may perform the sliding motion of changing from the slide-in state to the slide-out state, or changing from the slide-out state to the slide-in state. For example, the electronic device 101 may perform the sliding motion by at least partially controlling the driving motor 520 (e.g., driving motor 260 of FIG. 4A). According to an embodiment, the processor 120 of the electronic device 101 may drive the driving motor 520 based on sliding length related information (e.g., sliding length related information 513 of FIG. 5) stored in the memory 130.

In operation 1101, in response to a driving command for the driving motor 520, the processor 120 (e.g., processor 120 of FIG. 5) of the electronic device 101 may unlock a lock mode for the sliding motion. For example, the electronic device 101 may be in a state in which the lock mode is set to prevent the sliding motion from being arbitrarily performed. In the electronic device 101 with the lock mode set, the driving motor 520 may be at least partially in a deactivated state. According to an embodiment, in response to the user's first touch input (e.g., force touch input), the processor 120 may generate the driving command for driving the driving motor 520. If the driving command is identified, the processor 120 may unlock the lock mode for the sliding motion and may at least partially activate the driving motor 520.

In operation 1103, the processor 120 may output sliding content (e.g., visual indicator) that represents the sliding length according to the sliding motion. For example, the sliding content may visually provide the state (e.g., slide-in state, slide-out state) of the electronic device according to the sliding motion. For example, the sliding content may be implemented as a bar-shaped graph, and may display the visual effect that the bar length decreases or increases according to the sliding motion. Operation 1101 and operation 1103 are not limited to being performed sequentially, and operation 1101 may be performed after operation 1103 is performed. Alternatively, they may be performed substantially at the same time.

In operation 1105, the processor 120 may drive the driving motor 520 such that the sliding motion is performed based on the sliding content. For example, the processor 120 may identify a set screen ratio (e.g., screen size, screen area, screen ratio, size of display area) based on feature information of the object (e.g., application program) and may drive the driving motor 520 according to the set screen ratio. The sliding content may be changed based on the sliding length and may indicate a current sliding state. The processor 120 may identify a screen ratio changed due to driving of the driving motor 520, and may be changed based on the identified screen ratio.

According to an embodiment, in response to a touch input for the object, the processor 120 may identify an application program (e.g., application program stored in memory (e.g., memory 130 of FIG. 5)) corresponding to the object, and may execute the identified application program. When executing the application program, the processor 120 may identify feature information (e.g., set screen size, set screen area, set screen ratio, size of set display area) of the application program, and may drive the driving motor 520 based on the identified feature information. For example, an application program A may be in a state in which a screen ratio is set to about 6:4 as an optimized screen ratio in response to a running situation. In response to a situation in which the application program A is executed, the processor 120 may identify the set screen ratio (e.g., about 6:4 screen ratio) and may control the driving motor 520 such that the sliding motion is performed according to the set screen ratio. According to an embodiment, when executing a specific application program, the processor 120 may identify a screen ratio (e.g., feature information, information related to screen ratio) optimized for the specific application program, and may drive the driving motor 520 based on the identified screen ratio. The processor 120 may display an execution screen of the specific application program through the display module 160 of which a display area is changed in response to the optimized screen ratio.

In operation 1107, the processor 120 may identify a gesture event according to the touch input based on the sliding content. For example, the gesture event may include the user's gesture input (e.g., drag input, sliding input) for the sliding content. The gesture event may include a first gesture input that occurs along a direction in which the second housing 220 of the electronic device 101 moves outwardly (e.g., direction in which state changes from slide-in state to slide-out state) and a second gesture input that occurs along a direction in which the second housing 220 slides in the interior space of the first housing 210 (e.g., direction in which state changes from slide-out state to slide-in state). According to an embodiment, the processor 120 may identify a type of the gesture event (e.g., first gesture input or second gesture input), and may drive the driving motor 520 based on the identified type.

In operation 1109, the processor 120 may drive the driving motor 520 such that the sliding motion is performed based on the gesture event. For example, the processor 120 may drive the driving motor 520 in such a manner that the display area of the display module 160 increases in response to the first gesture input (e.g., gesture event that changes from slide-in state to slide-out state). For example, the electronic device 101 may rotate the driving motor 520 along the first direction. As another example, the processor 120 may drive the driving motor 520 in such a manner that the display area of the display module 160 decreases in response to the second gesture input (e.g., gesture event that changes from slide-out state to slide-in state). For example, the electronic device 101 may rotate the driving motor 520 along a second direction corresponding to the direction opposite to the first direction. If the first direction is clockwise, the second direction may be counterclockwise.

According to an embodiment, the processor 120 may detect a gesture event for the sliding content (e.g., visual indicator) and may drive the driving motor 520 such that the sliding motion is performed based on the gesture event.

Figure 12A:
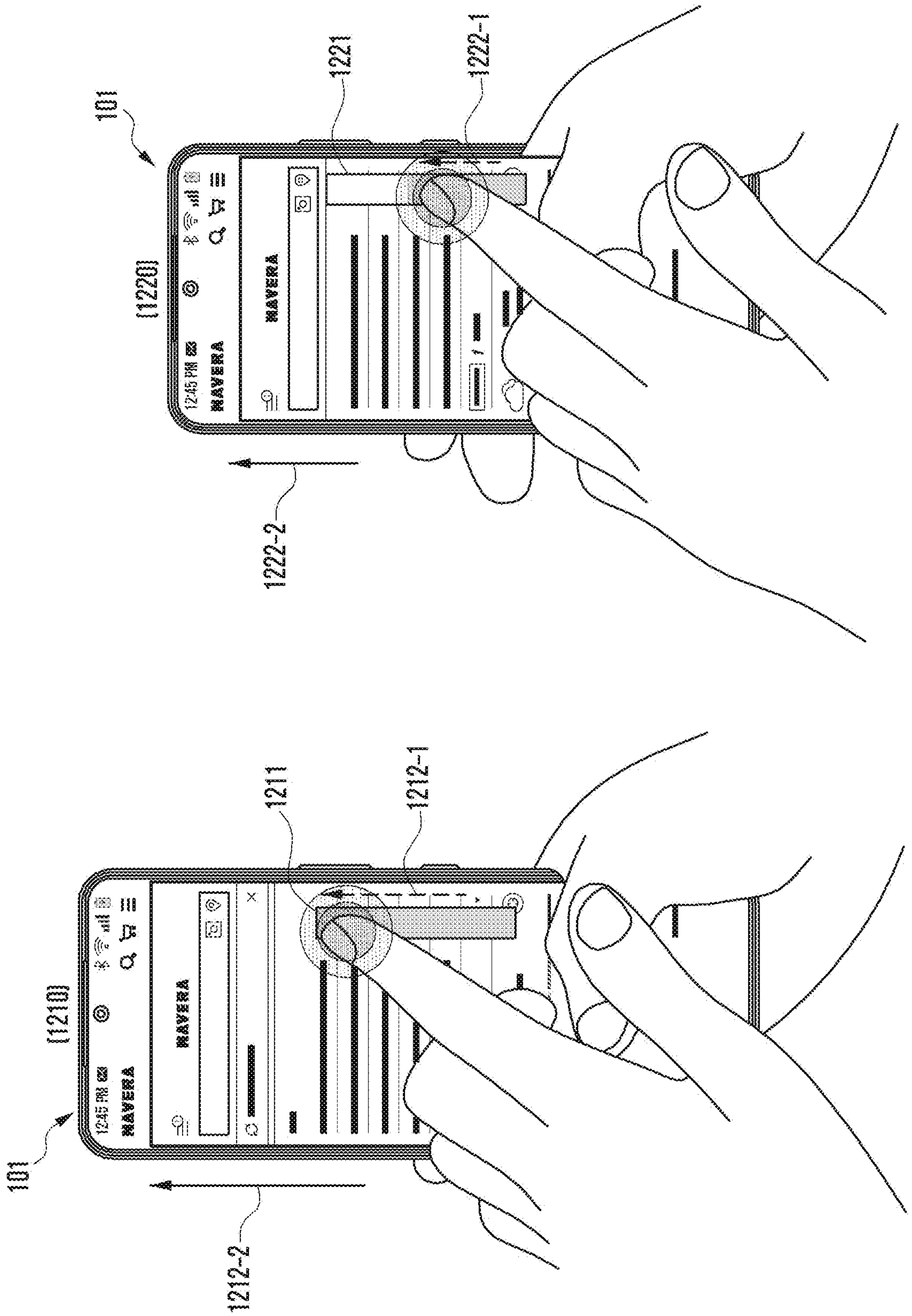
FIG. 12A is a diagram illustrating a method of adjusting a sliding length in response to a gesture input for sliding content according to an embodiment of the disclosure.

FIG. 12A is a diagram illustrating a method of adjusting a sliding length in response to a gesture input for sliding content according to an embodiment of the disclosure.

Figure 12B:
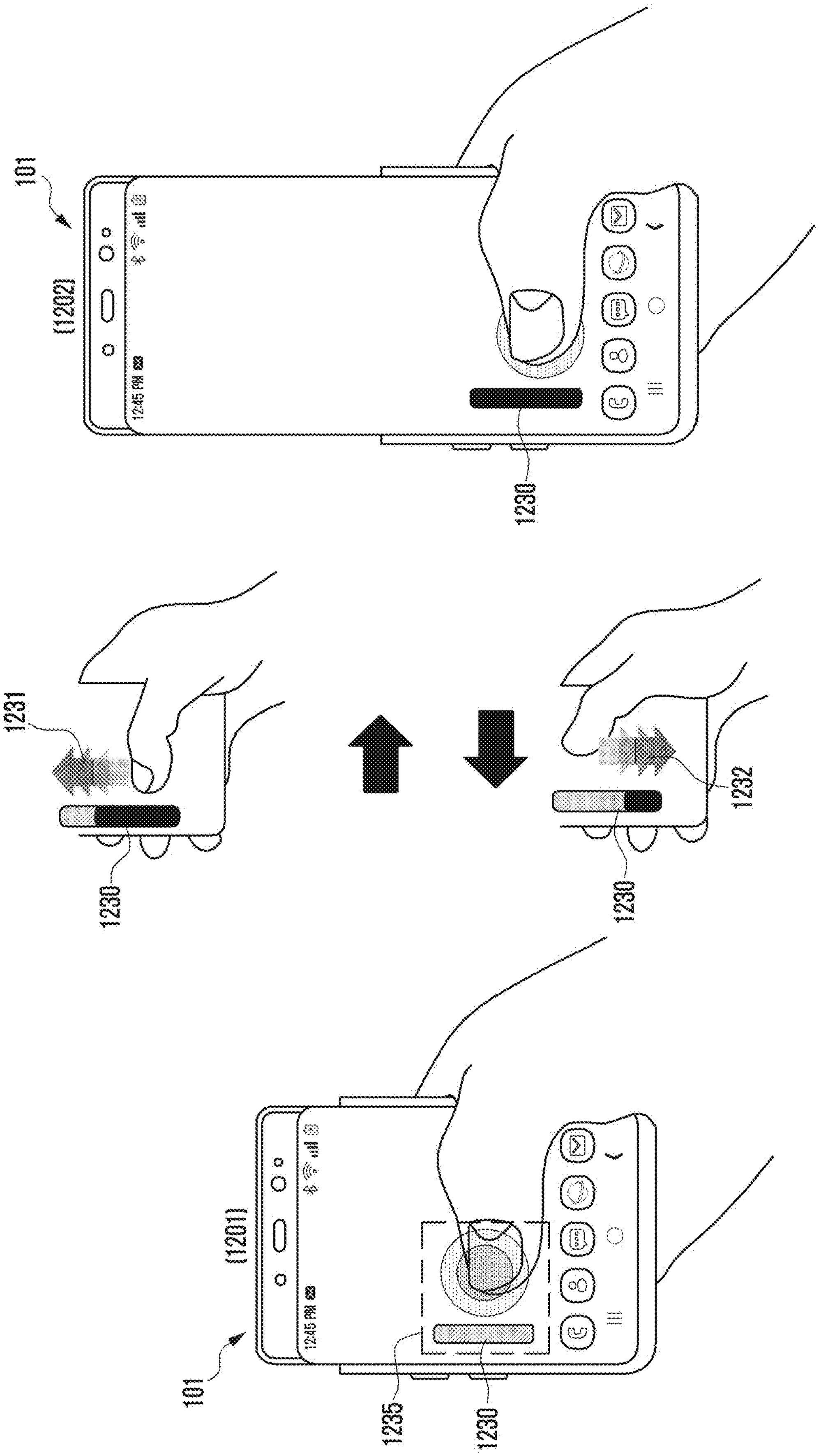
FIG. 12B is a diagram illustrating a method of identifying a movement direction of a gesture input based on sliding content and adjusting a sliding length based on the movement direction according to an embodiment of the disclosure.

FIG. 12B is a diagram illustrating a method of identifying a movement direction of a gesture input based on sliding content and adjusting a sliding length based on the movement direction according to an embodiment of the disclosure.

Figure 12C:
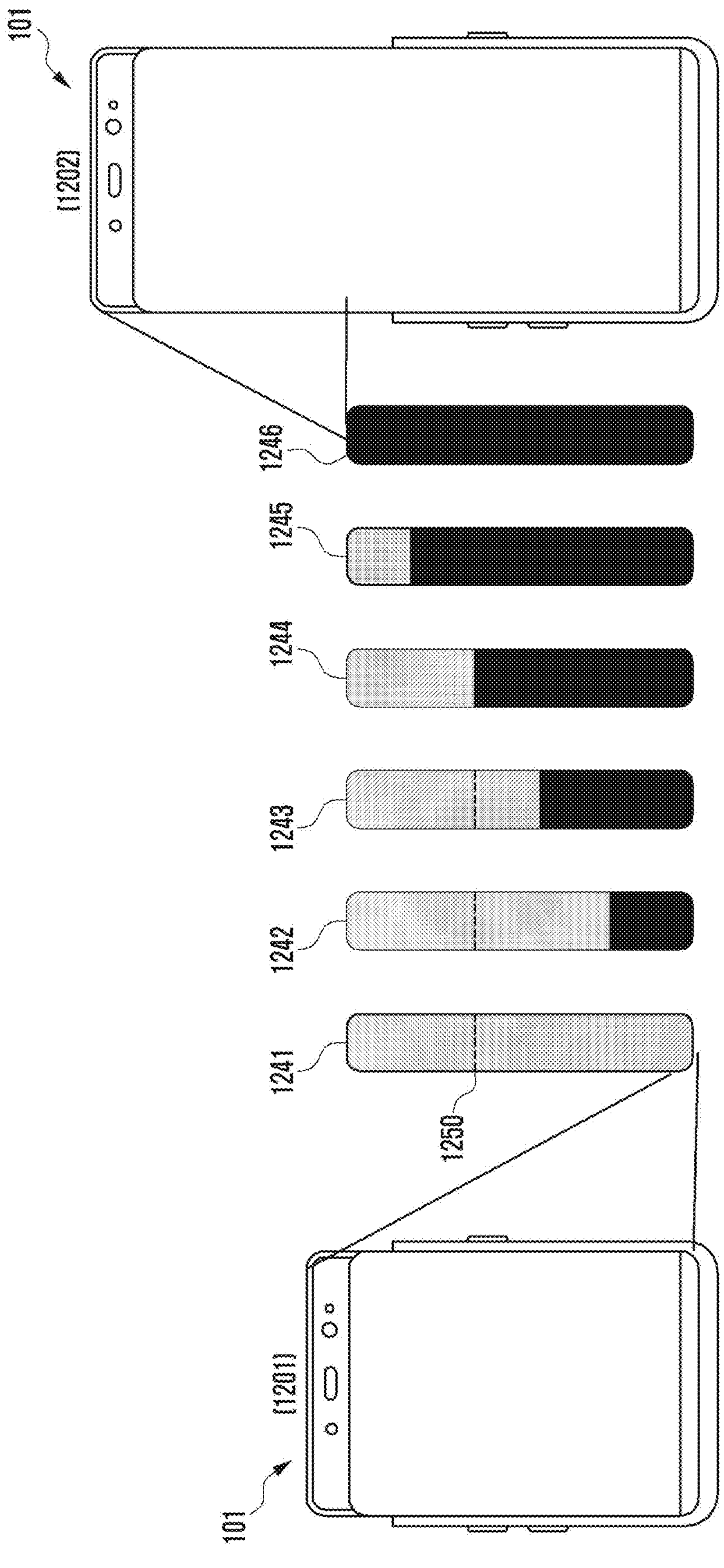
FIG. 12C is a diagram illustrating a method of determining a sliding length in correspondence to a bar length of sliding content according to an embodiment of the disclosure.

FIG. 12C is a diagram illustrating a method of determining a sliding length in correspondence to a bar length of sliding content according to an embodiment of the disclosure.

The electronic device 101 of FIGS. 12A to 12C (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

FIG. 12A illustrates the electronic device 101 in a first state 1210 that is a slide-out state and the electronic device 101 in a second state 1220 that is an intermediate state between a slide-in state and the slide-out state.

Referring to FIG. 12A, the electronic device 101 may detect the user's gesture input for sliding content (e.g., visual indicator) and, in response to the gesture input, may perform the sliding motion.

With reference to the first state 1210, a processor (e.g., processor 120 of FIG. 1) of the electronic device 101 may perform the sliding motion by a first length 1212-2 in response to a first gesture input 1212-1 for sliding content 1211. For example, the first gesture input 1212-1 may include the gesture input that changes from the slide-in state to the slide-out state. For example, the processor 120 may perform the sliding motion by the first length 1212-2 along a direction of the first gesture input 1212-1 (e.g., sliding direction), and may transition the electronic device 101 from the slide-in state to the slide-out state. The processor 120 may perform the sliding motion by driving a driving motor (e.g., driving motor 520 of FIG. 5) based on the first length 1212-2. The processor 120 may identify a screen ratio (e.g., size of display area, ratio of display area) of the display module (e.g., display module 160 of FIG. 5) according to the sliding motion, and may output content based on the identified screen ratio.

According to an embodiment, in response to the first gesture input 1212-1, the processor 120 may allow the sliding motion to be performed and the display area of the display module 160 may be at least partially extended. The processor 120 may identify the extended display area, and may identify a screen ratio according to the display area. For example, with reference to FIG. 12A, the screen ratio of the display module 160 may be changed in such a manner that the display area of the display module 160 is at least partially extended along the direction of the first gesture input 1212-1. The processor 120 may determine the size of the content based on the changed screen ratio, and may output the content according to the screen ratio. For example, the content may be output in a state in which the length corresponding to one side is extended along the direction of the first gesture input 1212-1.

With reference to the second state 1220, in response to a second gesture input 1222-1 for sliding content 1221, the processor 120 may perform the sliding motion by a second length 1222-2. For example, the second gesture input 1222-1 may include a gesture input that changes from the slide-in state to the intermediate state. For example, the processor 120 may perform the sliding motion by the second length 1222-2 along a direction of the second gesture input 1222-1 (e.g., sliding direction) and may transition the electronic device 101 from the slide-in state to the intermediate state. The processor 120 may allow the display area of the display module 160 to be at least partially extended along the direction of the second gesture input 1222-1, and the screen ratio of the display module 160 may be changed. The processor 120 may determine the size of content based on the changed screen ratio and may output the content according to the screen ratio.

According to an embodiment, the processor 120 may determine a rotation direction of the driving motor 520 based on a sliding direction (e.g., gesture direction according to first gesture input 1212-1 and second gesture input 1222-1). For example, when changing from the slide-in state to the slide-out state, the processor 120 may drive the driving motor 520 along a first rotation direction (e.g., clockwise). As another example, when changing from the slide-out state to the slide-in state, the processor 120 may drive the driving motor 520 along a second rotation direction (e.g., counterclockwise) corresponding to the direction opposite to the first rotation direction. The processor 120 may perform the sliding motion by identifying the rotation direction of the driving motor 520 and by at least partially driving the driving motor 520 along the identified rotation direction. According to an embodiment, the rotation direction of the driving motor 520 may not be limited to a specific direction.

According to an embodiment, after the gesture input is completed (e.g., after touch input according to gesture input is physically separate from display module 160), the electronic device 101 may perform the sliding motion. For example, in response to completion of the gesture input (e.g., input unlock), the processor 120 may at least partially drive the driving motor 520 and may at least partially move a housing of the electronic device 101.

According to an embodiment, the electronic device 101 may detect in real time a situation in which the gesture input is in progress, and may drive the driving motor 520 substantially identically to the gesture input. For example, the processor 120 may also perform the sliding motion by way of the driving motor 520, at the same with the gesture input.

FIG. 12B illustrates the electronic device 101 in a slide-in state 1201 and the electronic device 101 in a slide-out state 1202. Referring to FIG. 12B, the processor 120 may detect a gesture input (1231, 1232) of the user based on sliding content 1230. For example, the processor 120 may detect the gesture input (1231,1232) based on a range 1235 set based on the sliding content 1230. For example, the processor 120 may identify a first gesture input that is input along a first direction 1231, changing from the slide-in state 1201 to the slide-out state 1202, and a second gesture input that is input along a second direction 1232, changing from the slide-out state 1202 to the slide-in state 1201. The sliding content 1230 may be implemented as a bar graph in a bar shape, and in response to the first gesture input, may display the visual effect such that the bar length increases along the first direction 1231. In response to the second gesture input, the sliding content 1230 may display the visual effect such that the bar length decreases along the second direction 1232. The sliding content 1230 in the slide-out state 1202 may be displayed in a state in which the bar graph is increased to the maximum length.

According to an embodiment, the electronic device 101 in the slide-in state 1201 may detect a gesture input (e.g., touch input, force touch input) for the sliding content 1230 and then, continue to perform the first sliding motion from the slide-in state 1201 to the slide-out state 1202 in response to the first gesture input. For example, in response to a situation in which the first gesture input is completed (e.g., situation in which touch according to first gesture input is physically unlocked from display module 160), the electronic device 101 may perform the first sliding motion.

According to an embodiment, the electronic device 101 in the slide-out state 1202 may detect a gesture input (e.g., touch input, force touch input) for the sliding content 1230 and then, continue to perform the second sliding motion from the slide-out state 1202 to the slide-in state 1201 in response to the second gesture input. For example, in response to a situation in which the second gesture input is completed (e.g., situation in which touch according to second gesture input is physically unlocked from display module 160), the electronic device 101 may perform the second sliding motion.

According to an embodiment, when the gesture input is changed to the second gesture input while the first gesture input is being detected, the electronic device 101 may also change a direction of the sliding motion. For example, the first sliding motion and the second sliding motion may be arbitrarily changed and, in response to a real-time change in user input, the direction of the sliding motion may be changed. According to an embodiment, in a situation in which the first sliding motion and the second sliding motion are being performed, the electronic device 101 may display the sliding content 1230 based on a force touch input point according to the user input.

FIG. 12C illustrates sliding contents 1241, 1242, 1243, 1244, 1245, and 1246 in a situation in which transition from the slide-in state 1201 to the slide-out state 1202 is made or transition from the slide-out state 1202 to the slide-in state 1201 is made. For example, the sliding content 1241, 1242, 1243, 1244, 1245, 1246 may be displayed using a sliding length according to the sliding motion as a length of a bar graph. Referring to FIG. 12C, about six sliding contents 1241, 1242, 1243, 1244, 1245, and 1246 are displayed according to a ratio, but are not limited thereto. According to an embodiment, the sliding content is illustrated as a bar-shaped bar graph, but is not limited thereto.

According to an embodiment, the processor 120 may identify a set screen ratio (e.g., screen size, screen area, size of display area) of an object based on feature information of the object, and may display a reference line 1250 corresponding to the set screen ratio based on the sliding content. For example, a plurality of reference lines 1250 may be set.

According to an embodiment, the sliding content 1241, 1242, 1243, 1244, 1245, 1246 may be differently implemented for each object (e.g., application program, application). For example, an object A may be configured such that sliding content is classified into about three stages, an object B may be configured such that sliding content is classified into about four stages. According to an embodiment, if a force touch input of the user is detected, the electronic device 101 may identify an object corresponding to the force touch input and may identify the number of stages used to configure the sliding content in correspondence to the identified object. According to an embodiment, the electronic device 101 may differently configure the sliding stage for each object and may at least partially drive the driving motor 520 according to the sliding stage.

According to an embodiment, the electronic device 101 may determine the sliding length based on the gesture input for the sliding content (e.g., visual indicator) and may adjust the length of the bar graph such that the sliding length appears in the sliding content (e.g., bar graph).

According to an embodiment, the sliding content (e.g., visual indicator) may include a bar graph in a bar shape, an icon, a visual indicator, visual effect information that is output based on the object, and visual effect information that is output based on the flexible display 160. The sliding content may visually display the degree of the user's force touch input (e.g., touch strength, touch direction, and/or touch duration).

Figure 13:
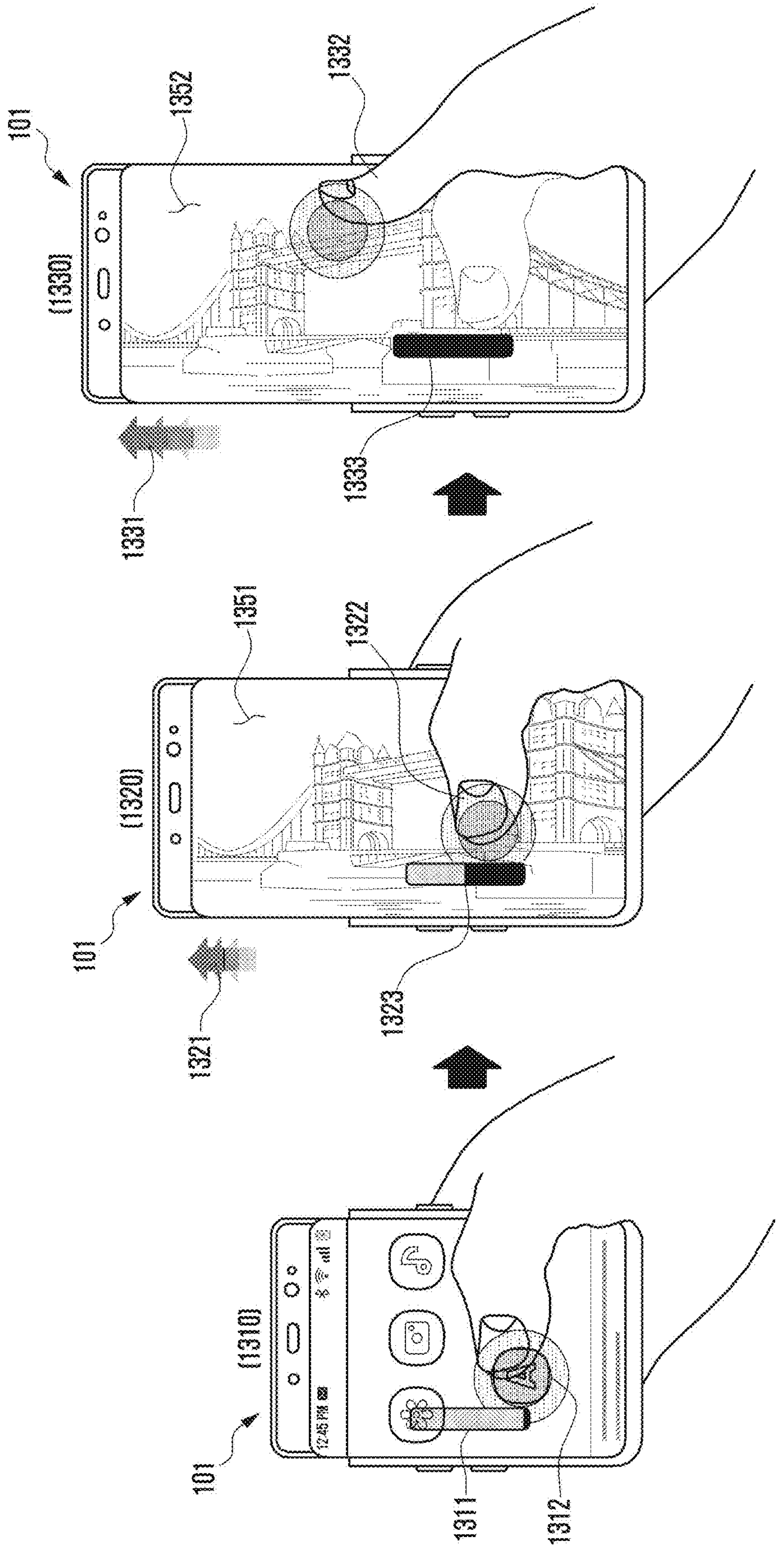
FIG. 13 is a diagram illustrating a method of primarily driving a driving motor according to a set screen ratio in response to a first touch input and secondarily driving the driving motor based on a gesture input for sliding content according to an embodiment of the disclosure.

FIG. 13 is a diagram illustrating a method of primarily driving a driving motor according to a set screen ratio in response to a first touch input and secondarily driving the driving motor based on a gesture input for sliding content according to an embodiment of the disclosure.

The electronic device 101 of FIG. 13 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

FIG. 13 illustrates the electronic device 101 in a first state 1310 (e.g., slide-in state), the electronic device 101 in a second state 1320 (e.g., intermediate state), and the electronic device 101 in a third state 1330 (e.g., slide-out state). For example, in the first state 1310, the electronic device 101 may be displaying a home screen that includes a plurality of objects. In the second state 1320, the electronic device 101 may execute an application program corresponding to an object and a first execution screen 1351 of the application program may be being displayed based on a set first screen ratio. In the third state 1330, the electronic device 101 may identify that, in response to the user's gesture input (e.g., second touch input 1332), the first screen ratio is changed to a second screen ratio, and based on the second screen ratio, a second execution screen 1352 may be being displayed. The electronic device 101 in the second state 1320 may detect a second touch input 1322 for sliding content 1323 in a state in which the first execution screen 1351 is being displayed and may change the first execution screen 1351 to the second execution screen 1352 in response to the second touch input 1322.

Referring to FIG. 13, a processor (e.g., processor 120 of FIG. 1) of the electronic device 101 may display an object corresponding to an application program stored in memory (e.g., memory 130 of FIG. 5) in the first state 1310. For example, among the plurality of objects, an object 1312 (e.g., with sliding motion set) that supports the sliding motion may be output together with sliding content 1311 related to the sliding motion. In the first state 1310, the processor 120 may identify a first touch input for the object 1312 (e.g., touch input that selects object 1312, touch input that executes application program corresponding to object 1312, force touch input).

In the second state 1320, in response to the first touch input (e.g., force touch input that satisfies sliding condition), the processor 120 may identify a first screen ratio set in correspondence to the object 1312 and may identify a first sliding length 1321 corresponding to the set first screen ratio. For example, in relation to an application program corresponding to the object 1312, the first screen ratio may be set. In response to execution of the application program, the processor 120 may identify the set first screen ratio (e.g., first sliding length 1321, optimized screen ratio based on output content) and may perform the sliding motion according to the first screen ratio. In response to the first touch input, the processor 120 may perform the sliding motion by the first sliding length 1321. The processor 120 may drive the driving motor 520 based on the first sliding length 1321. The bar length of the sliding content 1323 may be adjusted based on the first sliding length 1321. According to an embodiment, in response to executing the object 1312, the electronic device 101 may output video content based on the first screen ratio.

In the third state 1330, while the video content according to the first screen ratio is being output, the processor 120 may identify the second touch input 1332 for the sliding content 1323. For example, the second touch input 1332 may include the gesture input of the user related to the change in the screen ratio of the video content. The processor 120 may identify a second sliding length 1331 in response to the second touch input 1332. In the third state 1330, the processor 120 may perform the sliding motion by the second sliding length 1331 in response to the second touch input 1332 and may change the first execution screen 1351 to the second execution screen 1352. The processor 120 may drive the driving motor 520 based on the second sliding length 1331. A bar length of the sliding content 1333 may be adjusted based on the second sliding length 1331.

According to an embodiment, in the second state 1320, the electronic device 101 that is outputting the first execution screen 1351 may change the first execution screen 1351 to the second execution screen 1352 in response to the second touch input 1332. The processor 120 may change the first execution screen 1351 according to the first screen ratio to the second execution screen 1352 according to the second screen ratio and may output the same. According to an embodiment, even in a situation in which the video content is being output through a display module (e.g., display module 160 of FIG. 5), the electronic device 101 may continuously identify a gesture input of the user and may change a screen ratio of the video content based on the identified gesture input.

Figure 14A:
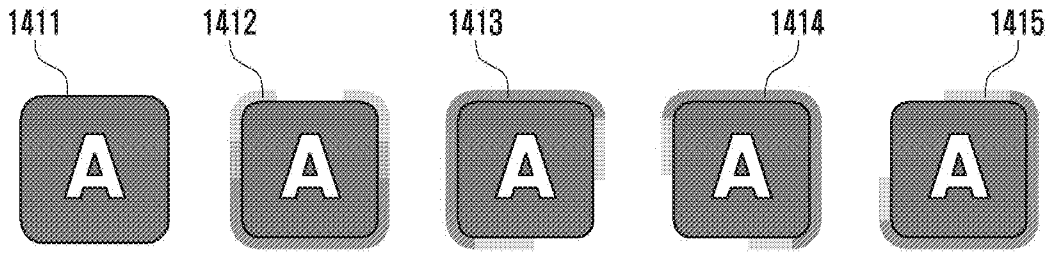
FIG. 14A is a first diagram illustrating a method of outputting the visual effect to an object in response to a first touch input according to an embodiment of the disclosure.

FIG. 14A is a first diagram illustrating a method of outputting the visual effect to an object in response to a first touch input according to an embodiment of the disclosure.

Figure 14B:
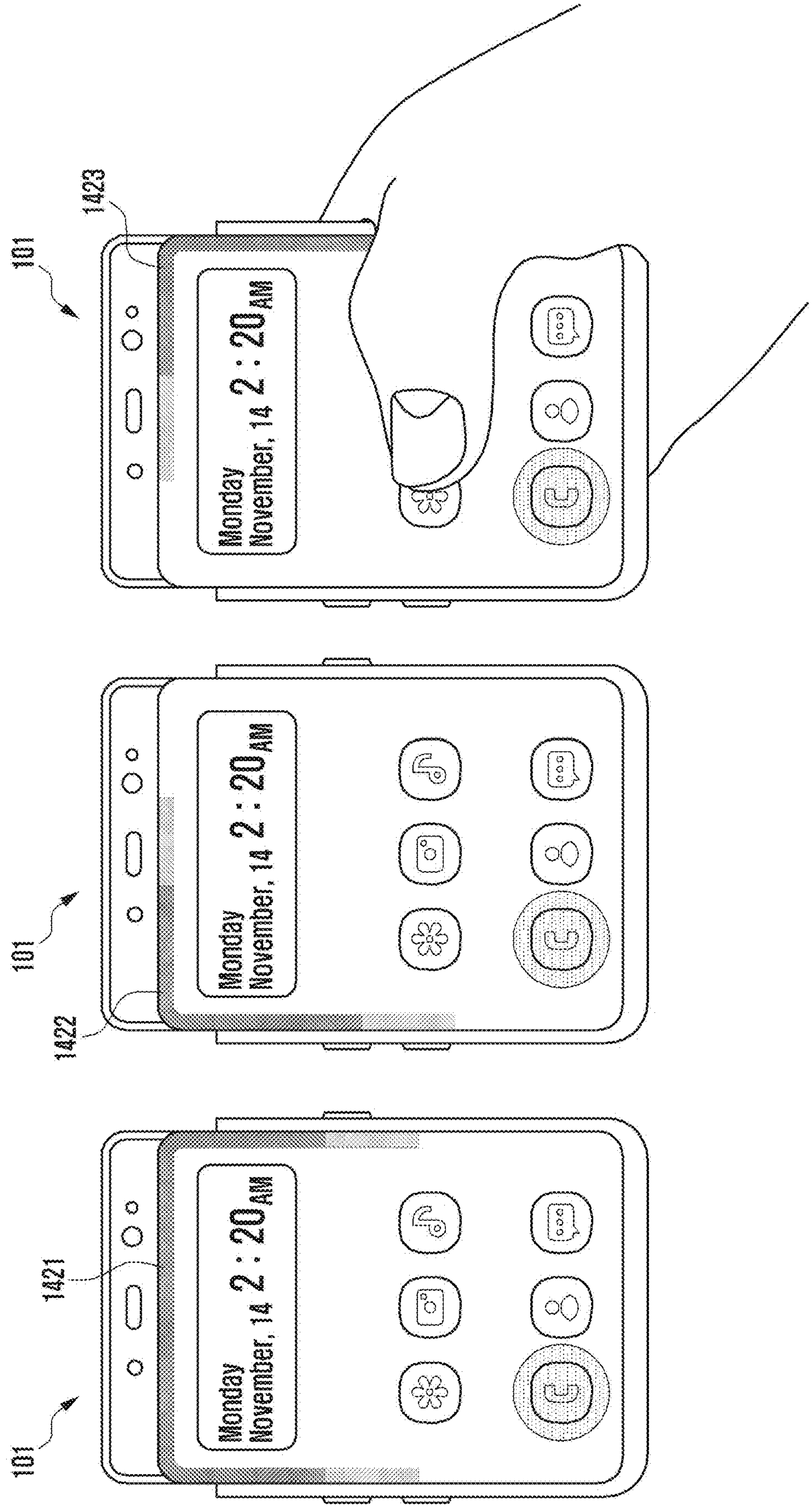
FIG. 14B is a second diagram illustrating a method of outputting the visual effect at the top edge of a display in response to a first touch input according to an embodiment of the disclosure.

FIG. 14B is a second diagram illustrating a method of outputting the visual effect at the top edge of a display in response to a first touch input according to an embodiment of the disclosure.

Figure 14C:
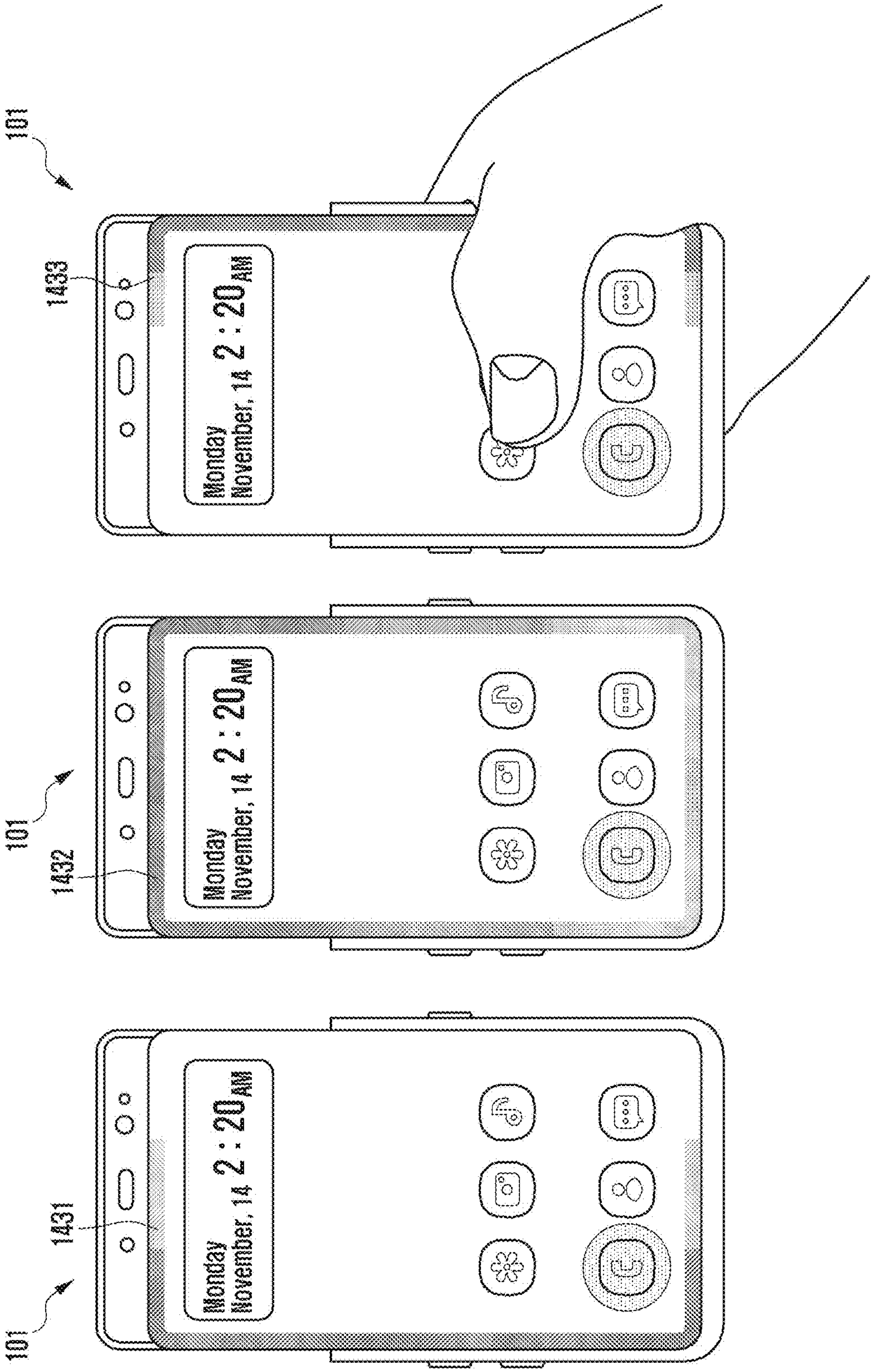
FIG. 14C is a third diagram illustrating a method of outputting the visual effect at the edge of a display in response to a first touch input according to an embodiment of the disclosure.

FIG. 14C is a third diagram illustrating a method of outputting the visual effect at the edge of a display in response to a first touch input according to an embodiment of the disclosure.

Figure 14D:
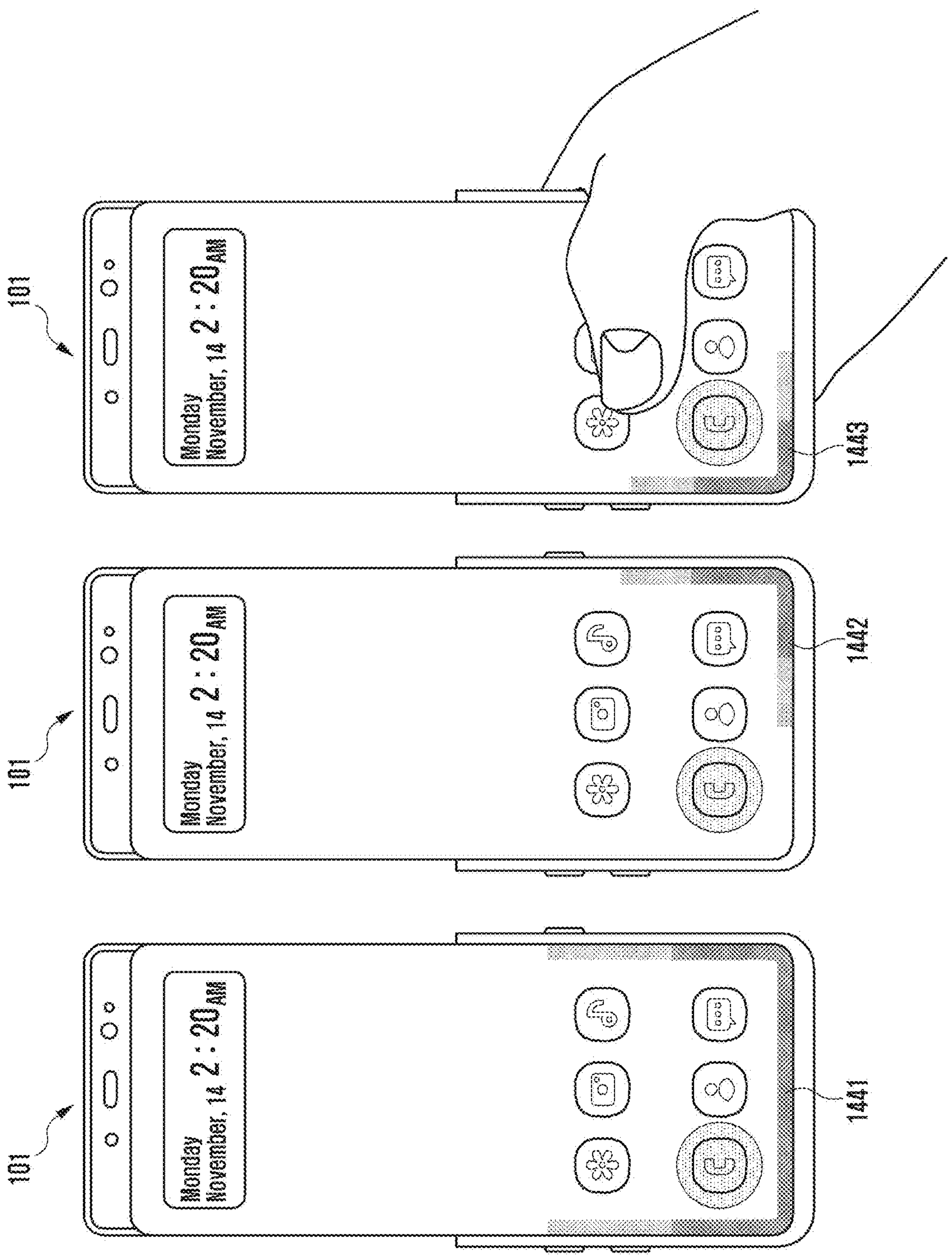
FIG. 14D is a fourth diagram illustrating a method of outputting the visual effect at the bottom edge of a display in response to a first touch input according to an embodiment of the disclosure.

FIG. 14D is a fourth diagram illustrating a method of outputting the visual effect at the bottom edge of a display in response to a first touch input according to an embodiment of the disclosure.

The electronic device 101 of FIGS. 14A to 14D (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

FIG. 14A illustrates examples of various types to which visual effect is reflected to an object (e.g., application program, icon, item) included in a home screen. A processor (e.g., processor 120 of FIG. 1) of the electronic device 101 may output the visual effect in relation to an object for which the sliding motion is set. A first object 1411 of the FIG. 14A may include an object for which the sliding motion is not set. A second object 1412 to a fifth object 1415 of FIG. 14A may each include an object for which the sliding motion is set and may output the visual effect (e.g., highlight effect) to the object when performing the sliding motion.

According to an embodiment, in response to a first touch input that satisfies a sliding condition (e.g., condition for performing sliding motion), the processor 120 may acquire feature information of the object corresponding to the first touch input and may perform the sliding motion based on the feature information of the object. When performing the sliding motion, the processor 120 may output the visual effect to the object (e.g., second object 1412, third object 1413, fourth object 1414, fifth object 1415). For example, the processor 120 may reflect and display the visual effect such that set color is displayed at an edge area (e.g., edge boundary) of the object.

Referring to FIGS. 14B to 14D, when performing the sliding motion, the processor 120 may reflect and display the visual effect (e.g., highlight effect, highlight display) at an edge area of a display module (e.g., display module 160 of FIG. 1). Referring to FIG. 14B, when the electronic device 101 is in the slide-in state, the processor 120 may output the visual effect based on an upper edge area 1421, 1422, 1423 of the display module 160. Referring to FIG. 14C, when the electronic device 101 is in the intermediate state, the processor 120 may output the visual effect based on an edge area 1431, 1432, 1433 of the display module 160. Referring to FIG. 14D, when the electronic device 101 is in the slide-out state, the processor 120 may output the visual effect based on a lower edge area 1441, 1442, 1443 of the display module 160. According to an embodiment, the visual effect output to the object and the display module 160 may not be limited to a specific state (e.g., slide-in state, intermediate state, slide-out state) and a specific area (e.g., upper edge, lower edge).

According to an embodiment, in response to the first touch input that satisfies the sliding condition (e.g., condition for performing sliding motion), the electronic device 101 may output the visual effect (e.g., highlight effect) to at least a partial area of the display module 160 while performing the sliding motion.

Figure 15:
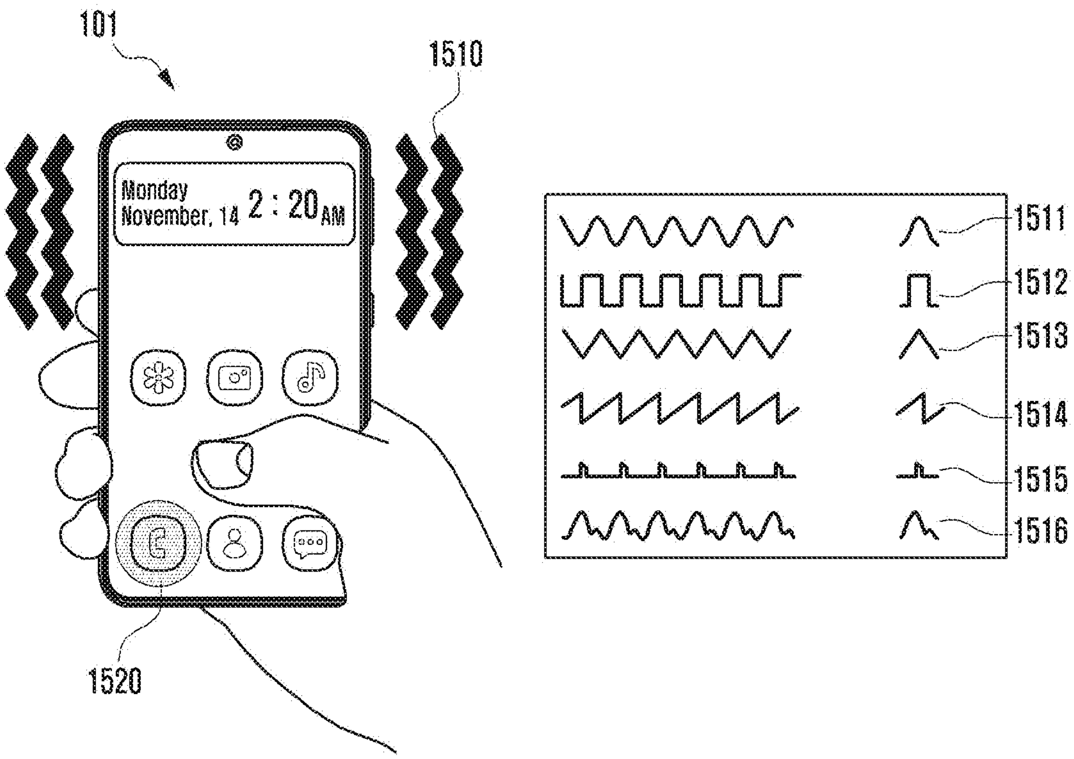
FIG. 15 is a first diagram illustrating a method of outputting a tactile signal based on a set pattern in response to a first touch input according to an embodiment of the disclosure.

FIG. 15 is a first diagram illustrating a method of outputting a tactile signal based on a set pattern in response to a first touch input according to an embodiment of the disclosure.

The electronic device 101 of FIG. 15 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

Referring to FIG. 15, in response to a first touch input 1520 that satisfies a sliding condition, the electronic device 101 may output a tactile signal (e.g., vibration signal, haptic signal) 1510. According to an embodiment, one of various types of vibration signals 1511, 1512, 1513, 1514, 1515, and 1516 may be set to an object. For example, the electronic device 101 may identify the first touch input 1520 for the object, and may output a vibration signal set based on the object when the sliding motion is performed according to execution of the object.

Figure 16A:
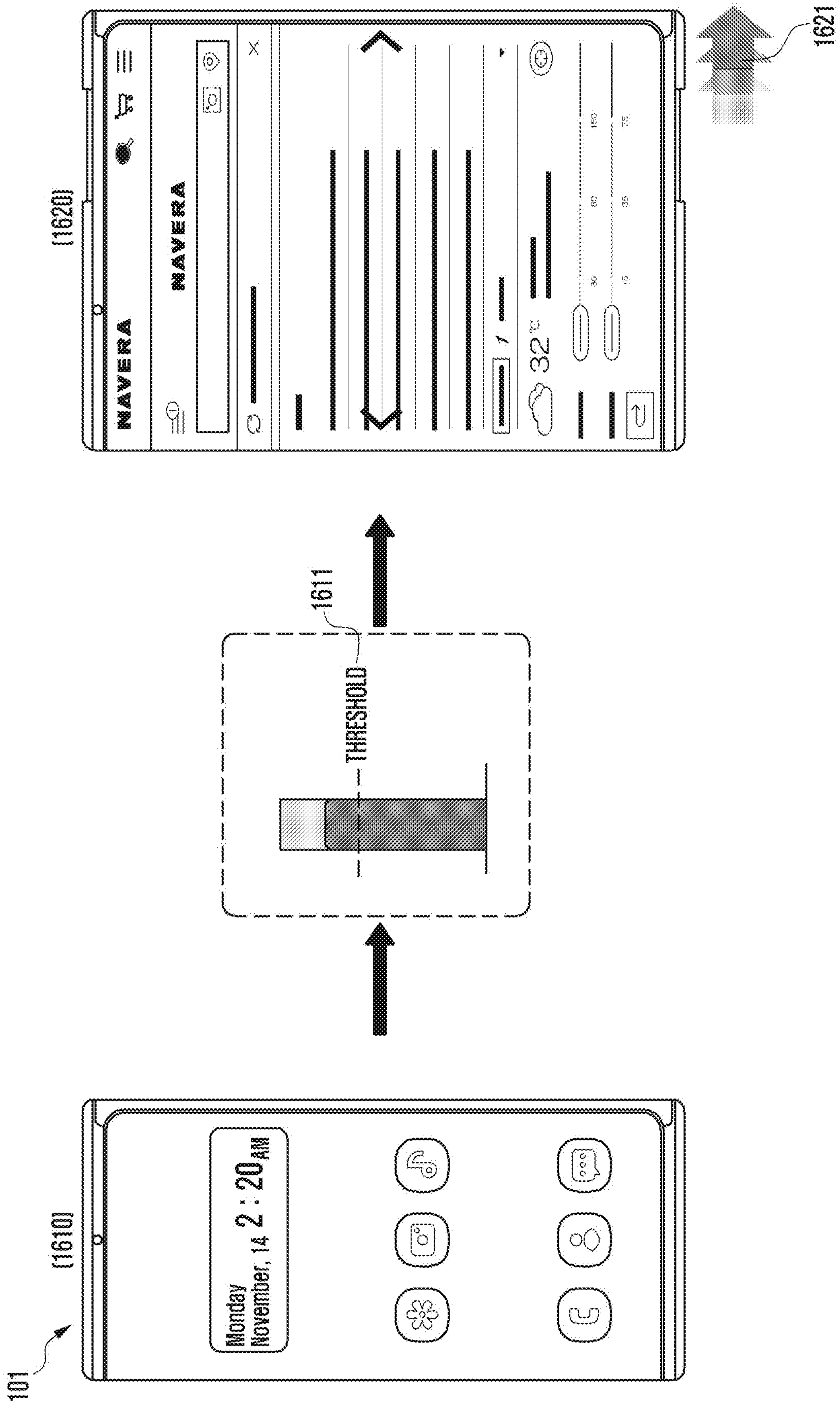
FIG. 16A is a first diagram illustrating a method of changing a display area of a display along a first direction in response to a first touch input in an electronic device that is a different type of form factor according to an embodiment of the disclosure.

FIG. 16A is a first diagram illustrating a method of changing a display area of a display along a first direction in response to a first touch input in an electronic device that is a different type of form factor according to an embodiment of the disclosure.

Figure 16B:
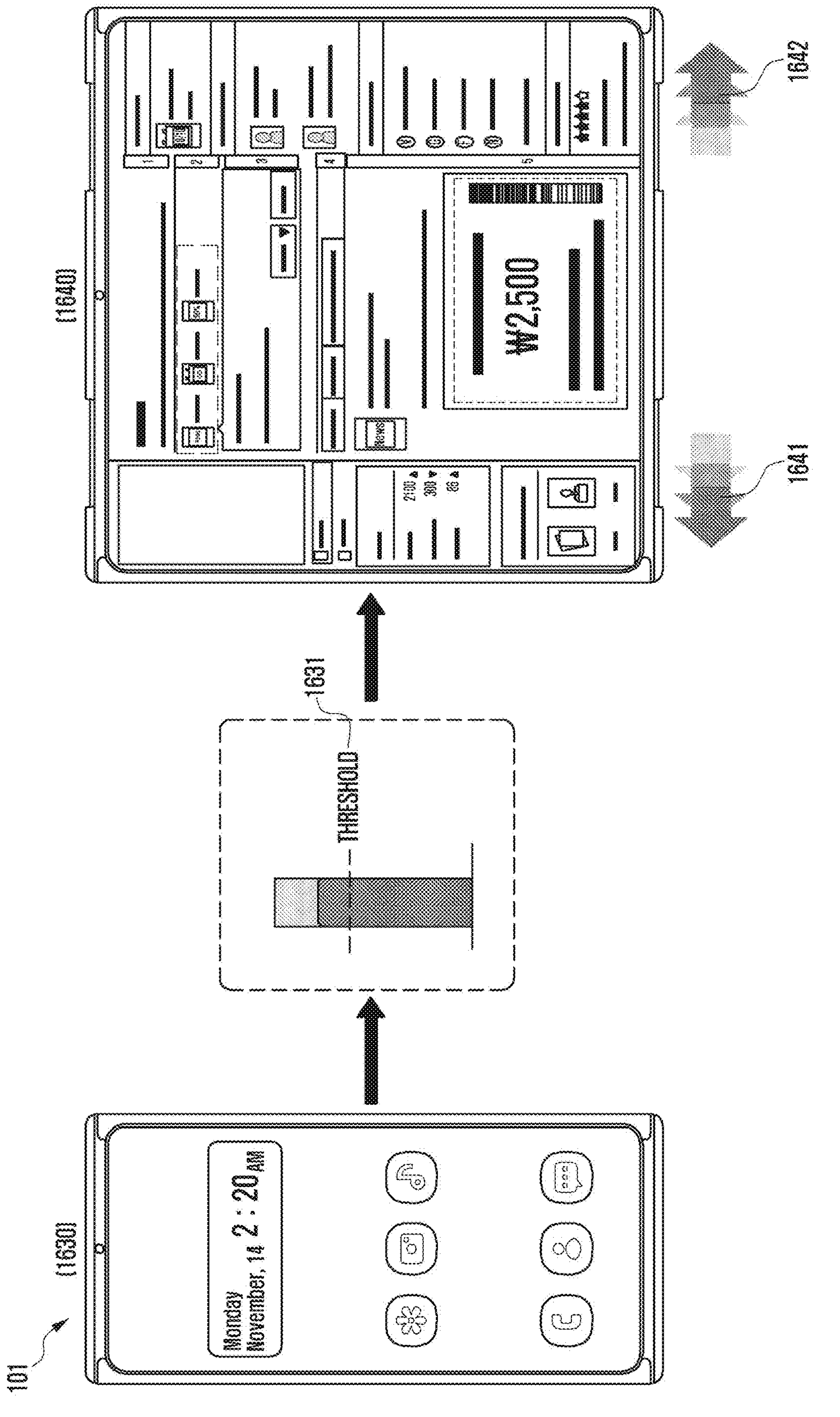
FIG. 16B is a second diagram illustrating a method of changing a display area of a display in a first direction and a second direction that is a direction opposite to the first direction in response to a first touch input in an electronic device that is a different type of form factor according to an embodiment of the disclosure.

FIG. 16B is a second diagram illustrating a method of changing a display area of a display in a first direction and a second direction that is a direction opposite to the first direction in response to a first touch input in an electronic device that is a different type of form factor according to an embodiment of the disclosure.

The electronic device 101 of FIGS. 16A and 16B (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

Referring to FIG. 16A, the electronic device 101 may include the first housing 210 and the second housing 220, and the second housing 220 may slide in the interior space of the first housing 210 in one direction, or the second housing 220 may slide out from the interior space of the first housing 210 in one direction.

Referring to FIG. 16B, the electronic device 101 includes the first housing, the second housing, and the third housing, and the second housing and the third housing may side in the interior space of the first housing 210 in both directions, or the second housing and the third housing may slide out from the interior space of the first housing in both directions.

In response to the first touch input that satisfies the sliding condition (e.g., touch input that applies pressure exceeding set first threshold 1611 for set period of time), the electronic device 101 of FIG. 16A may change from a slide-in state 1610 to a slide-out state 1620. For example, the second housing 220 that is at least partially slide in the interior space of the first housing 210 may slide out to an external environment along a first direction 1621. The electronic device 101 may display a screen through the display module 160 based on the slide-out state 1620.

In response to the first touch input that satisfies the sliding condition (e.g., touch input that applies pressure exceeding set second threshold 1631 for set period of time), the electronic device 101 of FIG. 16B may change from a slide-in state 1630 to a slide-out state 1640. For example, the second housing and the third housing that are at least partially slid in the interior space of the first housing may slide out to the external environment along a second direction 1641 and a third direction 1642. The electronic device 101 may display the screen through the display module 160 based on the slide-out state 1640.

According to an embodiment, the electronic device 101 is not limited to a specific form factor and may perform the sliding motion in various structures and shapes.

Figure 17:
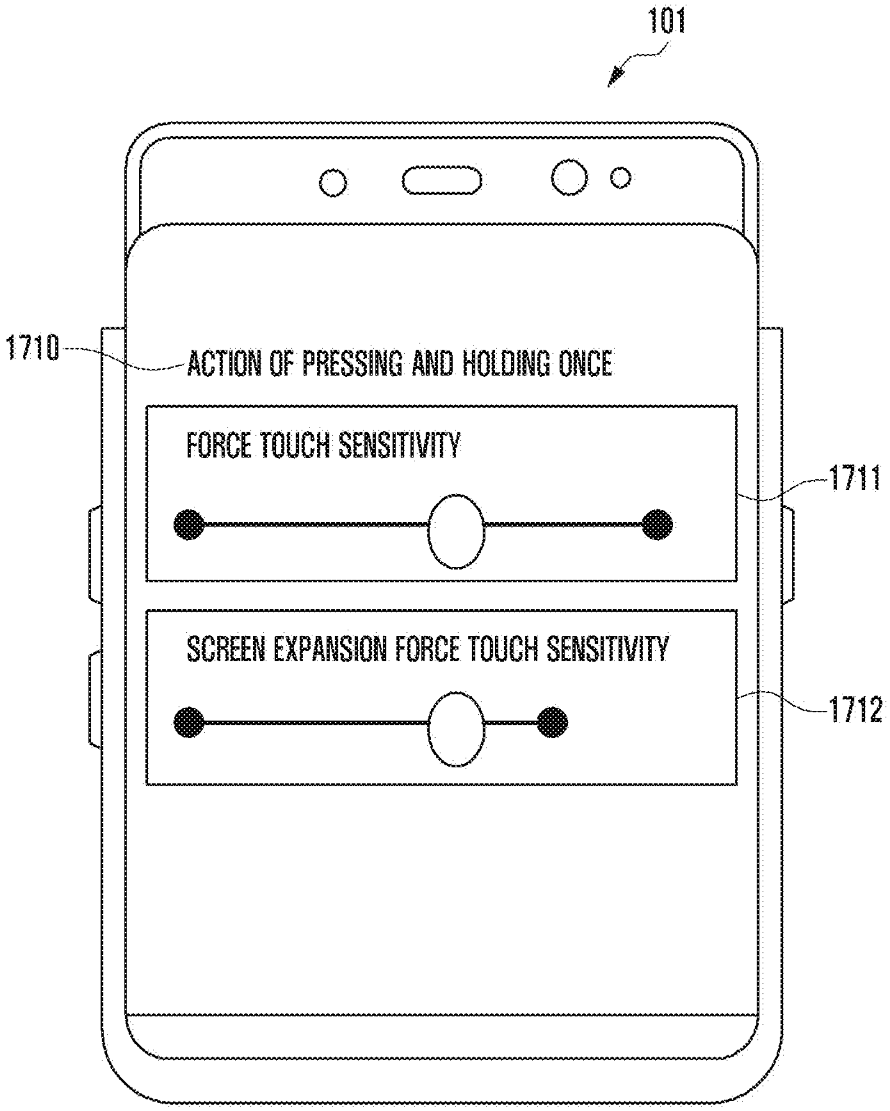
FIG. 17 is a diagram illustrating a method of changing configuration information of a first touch input according to an embodiment of the disclosure.

FIG. 17 is a diagram illustrating a method of changing configuration information of a first touch input according to an embodiment of the disclosure.

The electronic device 101 of FIG. 17 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

Referring to FIG. 17, the electronic device 101 may change configuration information 1710 on a first touch input (e.g., force touch input) that satisfies a sliding condition. For example, the electronic device 101 may separately configure first configuration information 1711 (e.g., configuration information related to sensitivity of first touch input) according to the sliding condition in a slide-in state (e.g., condition for transition from slide-in state to slide-out state) and second configuration information 1712 according to the sliding condition in a slide-out state (e.g., condition for transition from slide-out state to slide-in state). According to an embodiment, a processor (e.g., processor 120 of FIG. 1) of the electronic device 101 may display a configuration information option (e.g., configuration information 1710) related to the sliding condition, and the first configuration information 1711 and the second configuration information

1712 may be changed by the user. According to an embodiment, when the sliding motion is performed, the user convenience may be improved.

Figure 18:
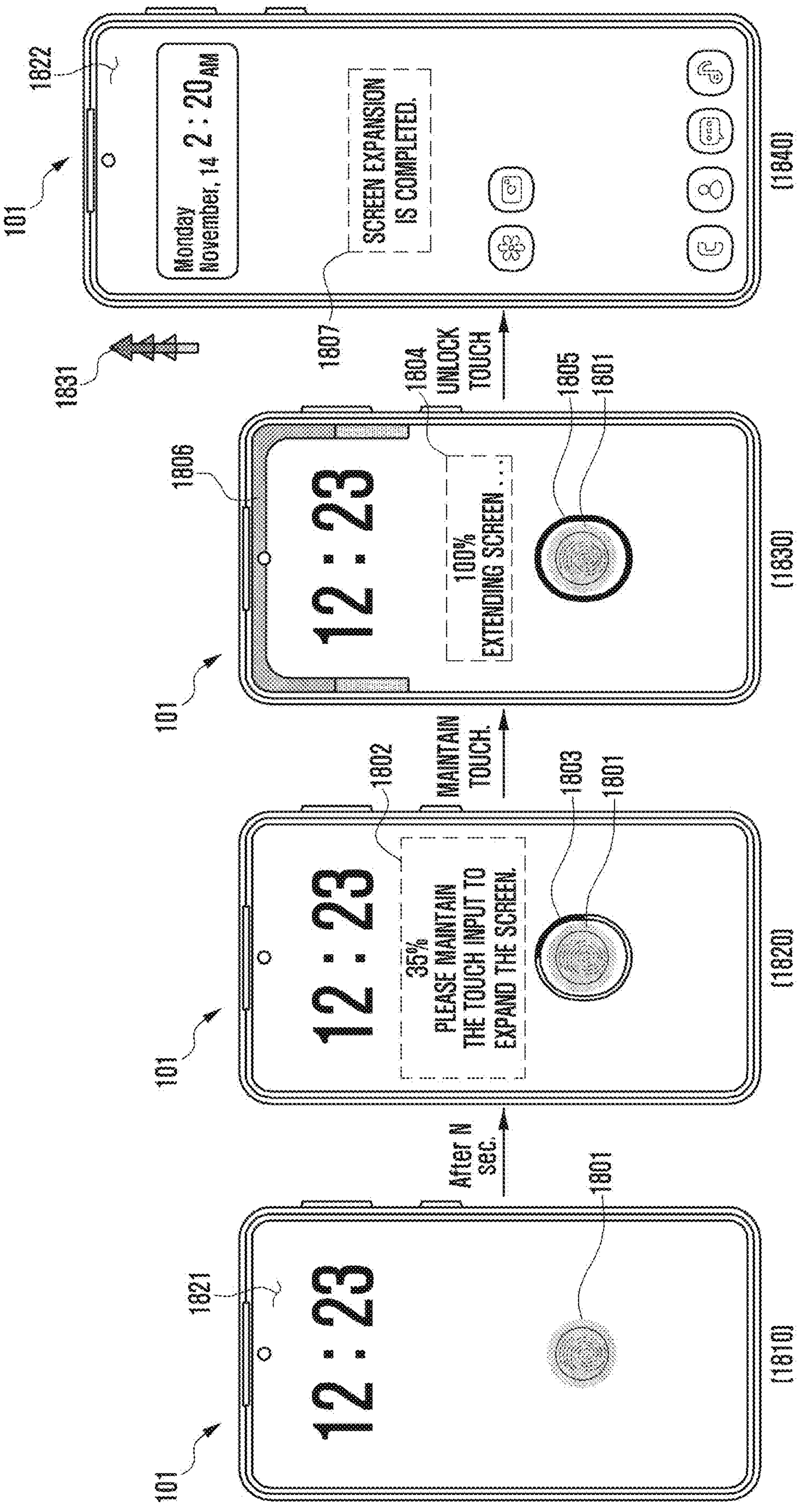
FIG. 18 is a diagram illustrating a method of unlocking a lock screen and performing the sliding motion in response to a first touch input in a lock screen state according to an embodiment of the disclosure.

FIG. 18 is a diagram illustrating a method of unlocking a lock screen and performing the sliding motion in response to a first touch input in a lock screen state according to an embodiment of the disclosure.

The electronic device 101 of FIG. 18 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

FIG. 18 illustrates the electronic device 101 in a first state 1810 (e.g., slide-in state), the electronic device 101 in a second state 1820 (e.g., state in which first touch input (e.g., force touch input) is in progress), the electronic device 101 in a third state 1830 (e.g., state in which first touch input (e.g., force touch input) is completed), and the electronic device 101 in a fourth state 1840 (e.g., slide-out state).

The electronic device 101 in the first state 1810 may display a lock screen 1821 through a display module (e.g., display module 160 of FIG. 1). The electronic device 101 in the first state 1810 may display the lock screen 1821 in the slide-in state. For example, a fingerprint recognition area 1801 for recognizing the user's fingerprint may be included in and displayed on the lock screen 1821. According to an embodiment, the electronic device 101 in the first state 1810 may detect a first touch input (e.g., force touch input) based on the fingerprint recognition area 1801, and may determine whether the first touch input satisfies a sliding condition. In response to a situation in which the sliding condition is satisfied, the electronic device 101 may display sliding content 1803.

According to an embodiment, in response to detecting the first touch input, the electronic device 101 may perform a fingerprint authentication function based on the fingerprint recognition area 1801 and, substantially at the same time, may determine whether the sliding condition according to the first touch input is satisfied. According to an embodiment, when a first condition that the fingerprint authentication succeeds is identified according to the fingerprint authentication function and a second condition that the sliding condition is satisfied is identified, the electronic device 101 may display the sliding content 1803 for the sliding motion.

The electronic device 101 in the second state 1820 may display the sliding content 1803 (e.g., progress bar) that visually indicates the progress process of the first touch input on the lock screen 1821 and guide information 1802 that guides the first touch input to be maintained (e.g., "35%, Please maintain the touch input to expand the screen."). The electronic device 101 in the second state 1820 may be in a state in which the first touch input has progressed about 35% compared to a set threshold (e.g., threshold time).

The electronic device 101 in the third state 1830 may display sliding content 1805 and guide information 1804 (e.g., "100%, Extending screen") in a situation in which the first touch input is completed. The electronic device 101 may also display a highlight effect 1806 according to performing of the sliding motion. For example, the electronic device 101 may visually display the highlight effect 1806 (e.g., stress effect) on an edge area of a screen display area. The electronic device 101 may at least partially drive the driving motor 520 while displaying the highlight effect 1806.

According to an embodiment, the electronic device 101 may identify a driving time of the driving motor 520 according to the sliding content 1805, and may drive the driving motor 520 based on the identified driving time. For example, the driving time of the driving motor 520 may be determined in proportion to a touch maintaining time of the first touch input. The electronic device 101 in the second state 1820 may drive the driving motor 520 for a period of time corresponding to about 35%, which may indicate that a transition process from the slide-in state to the slide-out state has progressed about 35%. The electronic device 101 in the third state 1830 may drive the driving motor 520 for a period of time corresponding to about 100%, which may indicate a state changed to the slide-out state. According to an embodiment, the electronic device 101 may start driving the driving motor 520 in response to a situation in which the first touch input is unlocked from the display module 160.

In response to a situation in which the first touch input is completed, the electronic device 101 in the fourth state 1840 may drive the driving motor 520, and may display a home screen 1822 in the slide-out state through the sliding motion according to driving of the driving motor 520. The electronic device 101 may change from the slide-in state to the slide-out state, and may display guide information 1807 (e.g., "Screen expansion is completed."). The electronic device 101 in the fourth state 1840 may at least partially expand the display area of the display module 160 along a first direction 1831 and may display the home screen 1822 based on the extended display area. As another example, the electronic device 101 may display an application screen just before changing to a lock screen mode based on the extended display area.

Figure 19:
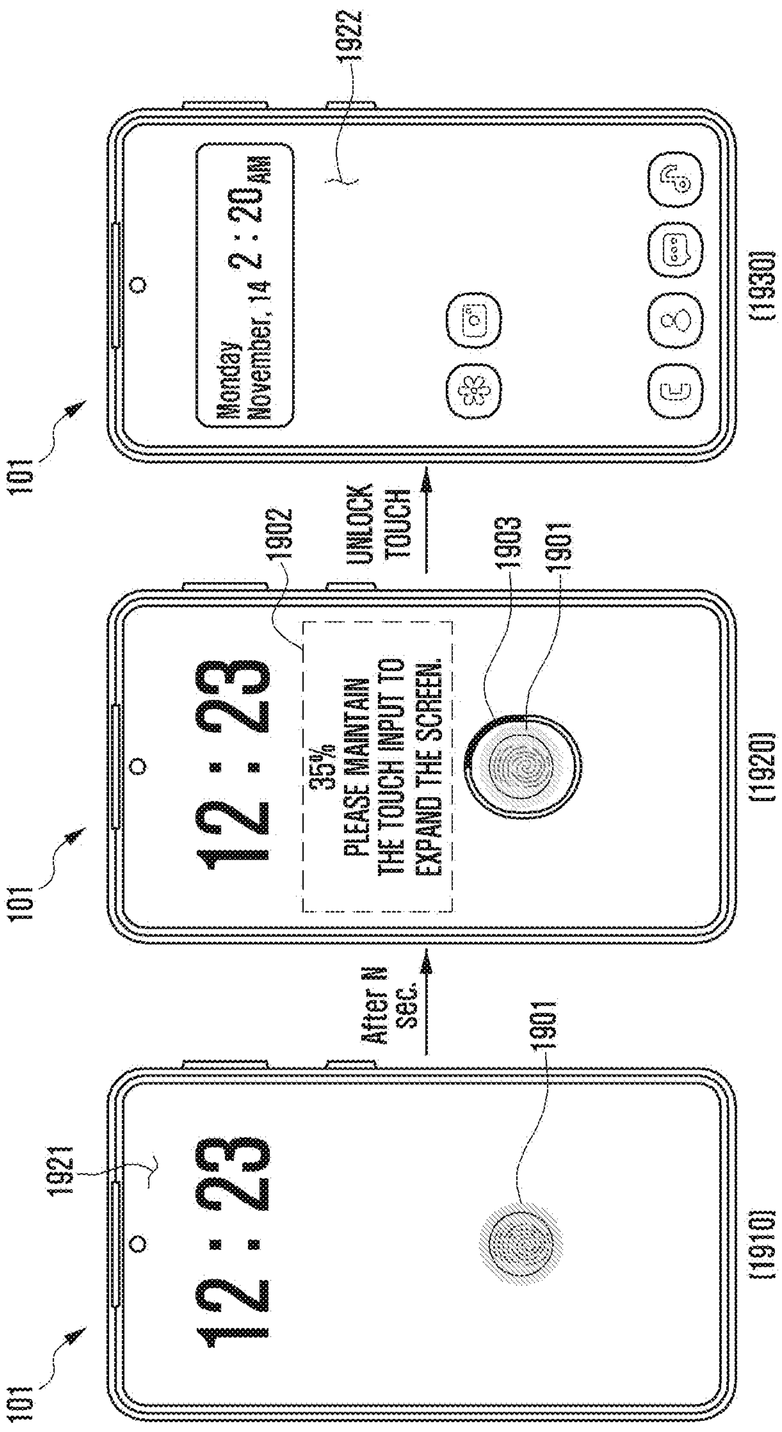
FIG. 19 is a diagram illustrating a method of unlocking only a lock screen in response to a situation in which a first touch input is not completed in a lock screen state according to an embodiment of the disclosure.

FIG. 19 is a diagram illustrating a method of unlocking only a lock screen in response to a situation in which a first touch input is not completed in a lock screen state according to an embodiment of the disclosure.

The electronic device 101 of FIG. 19 (e.g., electronic device 101 of FIGS. 1 and 5) may be at least partially similar to the electronic device 200 of FIGS. 2A, 2B, 3A, 3B, 4A, and 4B, or may further include other embodiments of the electronic device. The electronic device 101 may include a rollable electronic device (e.g., slidable electronic device) that includes a plurality of housings (e.g., first housing 210 and second housing 220 of FIG. 2A).

FIG. 19 illustrates the electronic device 101 in a first state 1910 (e.g., state in which lock screen is being displayed in slide-in state), the electronic device 101 in a second state 1920 (e.g., state in which long touch input is in progress on lock screen), and the electronic device 101 in a third state 1930 (e.g., state in which long touch input in progress on lock screen is unlocked).

The electronic device 101 in the first state 1910 may display a lock screen 1921 through a display module (e.g., display module 160 of FIG. 1). The electronic device 101 in the first state 1910 may display the lock screen 1921 in the slide-in state. For example, a fingerprint recognition area 1901 for recognizing the user's fingerprint may be included in and displayed on the lock screen 1921. According to an embodiment, the electronic device 101 in the first state 1910 may detect a long touch input based on the fingerprint recognition area 1901.

According to an embodiment, in response to detecting the long touch input, the electronic device 101 may perform a fingerprint authentication function based on the fingerprint recognition area 1901 and, substantially at the same time, may determine whether a sliding condition according to the long touch input is satisfied. For example, when the long touch input exceeds a set threshold time, the sliding condition may be satisfied. According to an embodiment, the sliding condition is not limited to a specific input (e.g., force touch input, or long touch input), and may be set to various types.

The electronic device 101 in the second state 1920 may display sliding content 1903 (e.g., progress bar) that visually indicates the progress process of the long touch input (e.g., input time of long touch input) on the lock screen 1921 and guide information 1902 that guides the long touch input to be maintained (e.g., "35%, Please maintain the touch input to expand the screen."). The electronic device 101 in the second state 1920 may be in a state in which the long touch input has progressed about 35% compared to a set threshold (e.g., threshold time). For example, the electronic device 101 may output the sliding content 1903 when the long touch input is maintained for a certain period of time (e.g., about 3 seconds), and may perform the sliding motion when the set threshold time is exceeded.

The electronic device 101 in the third state 1930 may change the lock screen 1921 to a home screen 1922 and display the same. The electronic device 101 may display the home screen 1922 while maintaining the slide-in state. For example, in response to a situation in which the long touch input does not exceed the set threshold time, the electronic device 101 in the third state 1930 may display the home screen 1922 without performing the sliding motion. In response to a situation in which the long touch input is unlocked at less than the set threshold time, the electronic device 101 in the third state 1930 may not drive the driving motor 520 and may only unlock the lock screen 1921.

According to an embodiment, the electronic device 101 may configure a plurality of conditions for performing the sliding motion, and a different operation (e.g., slide-in operation, slide-out operation, and sliding motion configured for each stage) may be performed in response to each of the plurality of conditions.

According to an embodiment, disclosed is a method performed by an electronic device (e.g., electronic device 101 of FIG. 1) including a first housing (e.g., first housing 210 of FIG. 2A), a second housing (e.g., second housing 220 of FIG. 2A) configured to slidably couple to the first housing 210, a flexible display (e.g., display module 160 of FIGS. 1 and 5) of which a display area varies based on a sliding motion of the second housing 220, and a driving motor (e.g., driving motor 260 of FIG. 4A, driving motor 520 of FIG. 5) configured to control the sliding motion of the second housing 220. A method according to an embodiment may include detecting a touch input event for an object displayed through the flexible display 160, in response to detecting the touch input event, identifying whether the touch input event satisfies a sliding condition, when the touch input event displayed through the flexible display 160 satisfies the sliding condition, outputting sliding content corresponding to the object, and driving the driving motor 520 such that the display area of the flexible display 160 varies based on the sliding content.

The outputting the sliding content according to an embodiment may include identifying whether the touch input event is a first touch input that satisfies the sliding condition, when the touch input event is the first touch input that satisfies the sliding condition, acquiring feature information of the object, and outputting the sliding content based on the acquired feature information of the object.

The method according to an embodiment may further include displaying an execution screen of an application corresponding to the object based on the flexible display 160.

The identifying whether the touch input event is the first touch input that satisfies the sliding condition according to an embodiment may include identifying the change in a touch area according to the touch input event, and, when the change in the touch area during a unit time exceeds a set threshold, determining the touch input event as the first touch input that satisfies the sliding condition.

According to an embodiment, the feature information of the object may include at least one of display area related information related to the execution screen of the application corresponding to the object, information related to a sliding length determined based on the display area, or information related to driving of the driving motor 520 that performs the sliding motion based on the sliding length.

The driving the driving motor 520 according to an embodiment may include identifying a gesture input for the sliding content, determining the sliding length based on the identified gesture input, and at least partially driving the driving motor 520 based on the determined sliding length.

The method according to an embodiment may further include, in response to identifying the gesture input, identifying a sliding direction and a sliding length based on sliding length related information 513 stored in the memory 130, identifying a rotation direction and a driving time of the driving motor 520 based on the identified sliding direction and sliding length, and at least partially driving the driving motor 520 based on the identified rotation direction and driving time.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing configured to slidably couple to the first housing;

a flexible display of which a display area varies based on a sliding motion of the second housing;

a driving motor configured to control the sliding motion of the second housing;

memory storing instructions; and at least one processor operatively coupled to the flexible display, the driving motor, and the memory, wherein the instructions, when executed by the at least one processor individually or collectively, cause the electronic device to:

detect a touch input event for an object displayed through the flexible display, in response to detecting the touch input event, identify whether the touch input event satisfies a sliding condition, when the touch input event satisfies the sliding condition, output sliding content corresponding to the object, and drive the driving motor such that the display area of the flexible display varies based on the sliding content.

2. The electronic device of claim 1, wherein the instructions, when executed by the at least one processor individually or collectively, further cause the electronic device to:

identify whether the touch input event is a first touch input that satisfies the sliding condition, when the touch input event is the first touch input that satisfies the sliding condition, acquire feature information of the object, and output the sliding content based on the acquired feature information of the object, and wherein the first touch input includes a force touch input that applies a pressure of greater than or equal to a predetermined magnitude such that a change in a touch area according to the touch input event exceeds a set threshold.

3. The electronic device of claim 1, wherein the instructions, when executed by the at least one processor individually or collectively, further cause the electronic device to:

when the touch input event is a second touch input that does not satisfy the sliding condition, execute an application corresponding to the object, and display an execution screen of the application corresponding to the object based on the flexible display, and wherein the second touch input includes at least one of a force touch input that applies a pressure of a magnitude such that a change in a touch area according to the touch input event does not exceed a set threshold, a short touch input that is input for less than a set period of time, or a long touch input that is input for greater than or equal to the set period of time.

4. The electronic device of claim 2, wherein the instructions, when executed by the at least one processor individually or collectively, further cause the electronic device to:

identify the change in the touch area according to the touch input event, and when the change in the touch area for a unit time exceeds the set threshold, determine that the touch input event is the first touch input that satisfies the sliding condition.

5. The electronic device of claim 2, wherein the feature information of the object includes at least one of display area related information related to an execution screen of an application corresponding to the object, information related to a sliding length determined based on the display area, or information related to driving of the driving motor of which sliding motion is performed based on the sliding length.

6. The electronic device of claim 1, wherein the instructions, when executed by the at least one processor individually or collectively, further cause the electronic device to:

identify a gesture input for the sliding content, in response to identifying the gesture input, identify a sliding direction and a sliding length based on sliding length related information stored in the memory, identify a rotation direction and a driving time of the driving motor based on the identified sliding direction and sliding length, and at least partially drive the driving motor based on the identified rotation direction and driving time.

7. The electronic device of claim 1, wherein the sliding content includes at least one of a bar graph in a bar shape, an icon, a visual indicator, visual effect information that is output based on the object, or visual effect information that is output based on the flexible display.

8. The electronic device of claim 2, wherein the instructions, when executed by the at least one processor individually or collectively, further cause the electronic device to:

identify a sliding distance set in correspondence to the object based on the feature information of the object, and drive the driving motor based on the set sliding distance, and wherein, in response to execution of an application corresponding to the object, the set sliding distance is set based on an execution screen of the application.

9. The electronic device of claim 1, wherein the instructions, when executed by the at least one processor individually or collectively, further cause the electronic device to:

display a configuration information option related to the sliding condition, and change the sliding condition based on the configuration information option.

10. The electronic device of claim 1, wherein the instructions, when executed by the at least one processor individually or collectively, further cause the electronic device to:

in response to the touch input event satisfying the sliding condition, unlock a lock mode related to the sliding motion, and in response to unlocking the lock mode, output a feedback signal.

11. The electronic device of claim 1, further comprising:

a second housing configured to slidably couple to the first housing along a first direction;

a third housing configured to slidably couple to the first housing along a second direction corresponding to a direction opposite to the first direction; and a driving motor configured to control the sliding motion of the second housing and the third housing, wherein the instructions, when executed by the at least one processor individually or collectively, further cause the electronic device to:

when the touch input event satisfies the sliding condition, drive the driving motor such that the sliding motion is performed based on the second housing according to the first direction and the third housing according to the second direction.

12. The electronic device of claim 1, wherein the instructions, when executed by the at least one processor individually or collectively, further cause the electronic device to:

identify a sliding condition set based on the object, and in response to detecting the touch input event for the object, identify whether the touch input event satisfies the identified sliding condition.

13. A method performed by an electronic device comprising a first housing, a second housing configured to slidably couple to the first housing, a flexible display of which a display area varies based on a sliding motion of the second housing, and a driving motor configured to control the sliding motion of the second housing, the method comprising:

detecting a touch input event for an object displayed through the flexible display;

in response to detecting the touch input event, identifying whether the touch input event satisfies a sliding condition;

when the touch input event satisfies the sliding condition, outputting sliding content corresponding to the object; and driving the driving motor such that the display area of the flexible display varies based on the sliding content.

14. The method of claim 13, wherein the identifying of whether the touch input event satisfies the sliding content comprises:

identifying whether the touch input event is a first touch input that satisfies the sliding condition, wherein the outputting of the sliding content comprises:

when the touch input event is the first touch input that satisfies the sliding condition, acquiring feature information of the object; and outputting the sliding content based on the acquired feature information of the object, and wherein the first touch input includes a force touch input that applies a pressure of greater than or equal to a predetermined magnitude such that a change in a touch area according to the touch input event exceeds a set threshold.

15. The method of claim 13, wherein the identifying of whether the touch input event satisfies the sliding content comprises:

when the touch input event is a second touch input that does not satisfy the sliding condition, executing an application corresponding to the object, wherein the method further comprises:

displaying an execution screen of the application corresponding to the object based on the flexible display, and wherein the second touch input includes at least one of a force touch input that applies a pressure of a magnitude such that a change in a touch area according to the touch input event does not exceed a set threshold, a short touch input that is input for less than a set period of time, or a long touch input that is input for greater than or equal to the set period of time.

16. The method of claim 14, wherein the identifying of whether the touch input event satisfies the sliding content comprises:

identifying the change in the touch area according to the touch input event; and when the change in the touch area for a unit time exceeds the set threshold, determining that the touch input event is the first touch input that satisfies the sliding condition.

17. The method of claim 14, wherein the feature information of the object includes at least one of display area related information related to an execution screen of an application corresponding to the object, information related to a sliding length determined based on the display area, or information related to driving of the driving motor of which sliding motion is performed based on the sliding length.

18. The method of claim 13, wherein the driving of the driving motor comprises:

identifying a gesture input for the sliding content;

in response to identifying the gesture input, identifying a sliding direction and a sliding length based on sliding length related information stored in memory of the electronic device;

identifying a rotation direction and a driving time of the driving motor based on the identified sliding direction and sliding length; and at least partially driving the driving motor based on the identified rotation direction and driving time.

19. The method of claim 14, further comprising:

identifying a sliding distance set in correspondence to the object based on the feature information of the object; and driving the driving motor based on the set sliding distance, wherein, in response to execution of an application corresponding to the object, the set sliding distance is set based on an execution screen of the application.

20. One or more non-transitory computer-readable storage media storing one or more computer programs including computer-executable instructions that, when executed by at least one processor of an electronic device individually or collectively, cause the electronic device to perform operations comprising:

detecting a touch input event for an object displayed through a flexible display;

in response to detecting the touch input event, identifying whether the touch input event satisfies a sliding condition;

when the touch input event satisfies the sliding condition, outputting sliding content corresponding to the object; and driving a driving motor such that a display area of the flexible display varies based on the sliding content.

* * * * *